(12) United States Patent
Pelland

(10) Patent No.: US 9,658,818 B2
(45) Date of Patent: May 23, 2017

(54) ADAPTABLE AUDIO SYSTEMS

(71) Applicant: Princeton Audio, LLC, Princeton, WI (US)

(72) Inventor: Michael J. Pelland, Princeton, WI (US)

(73) Assignee: Princeton Audio, LLC, Princeton, WI (US)

( * ) Notice: Subject to any disclaimer, the term of this patent is extended or adjusted under 35 U.S.C. 154(b) by 72 days.

(21) Appl. No.: 14/823,842

(22) Filed: Aug. 11, 2015

(65) Prior Publication Data

US 2016/0041808 A1 Feb. 11, 2016

Related U.S. Application Data

(60) Provisional application No. 62/035,931, filed on Aug. 11, 2014.

(51) Int. Cl.
*H04R 3/00* (2006.01)
*G06F 3/00* (2006.01)
*G06F 3/16* (2006.01)

(52) U.S. Cl.
CPC .............. *G06F 3/162* (2013.01); *H04R 3/00* (2013.01); *H04R 2420/03* (2013.01); *H04R 2420/07* (2013.01); *H04R 2420/09* (2013.01)

(58) Field of Classification Search
CPC ............ H04R 2420/01; H04R 2420/03; H04R 2420/07; H04R 2420/09; H04R 3/00; H04R 5/033; G06F 3/16; G06F 3/162; G06F 3/26
See application file for complete search history.

(56) References Cited

U.S. PATENT DOCUMENTS 8,583,177 B2 11/2013 Griffin, Jr. et al.
2007/0244706 A1* 10/2007 Tsushima .............. G10L 19/008
704/500

(Continued)

OTHER PUBLICATIONS

Griffin Technology, iTrip Manual, Manual, 2004, 5 pgs, China.
Griffin Technology, iTrip Pocket, Brochure, 2007, 2 pgs, China.
Griffin Technology, iTrip Auto, Guide, 2009, 5 pgs, China.

*Primary Examiner* — Thang Tran
(74) *Attorney, Agent, or Firm* — Stephen C. Jensen; Northwind IP Law, S.C.

(57) ABSTRACT

Sound-producing devices such as headphone sets or loudspeakers are disclosed that can removably mate with an external interface. The external interface may plug into a port on an exterior of the sound-producing device. The external interface includes conversion circuitry that is powered by a power source in the sound-producing device. The external interface receives a first audio-encoded signal from a source device such as a mobile phone, tablet computer, or the like, and converts such signal to a conditioned signal which is compatible with the sound-producing device. Connection between the source device and the external interface may be a first type of wired or wireless connection. The sound-producing device may operate with other source devices that produce different audio-encoded signals by replacing the external interface with a different external interface whose conversion circuitry converts the different audio-encoded signal to the same conditioned signal. Alternative sound-producing devices are also disclosed.

12 Claims, 18 Drawing Sheets

(56) References Cited

U.S. PATENT DOCUMENTS

| | | | |
|---|---|---|---|
| 2010/0190532 A1* | 7/2010 | Sampat | G06F 9/44526 704/500 |
| 2011/0081861 A1* | 4/2011 | Kuo | A42B 3/30 455/41.3 |
| 2012/0093335 A1* | 4/2012 | Jung | G11B 19/02 381/86 |
| 2013/0034237 A1* | 2/2013 | Olafsson | H04R 1/406 381/74 |
| 2013/0251163 A1* | 9/2013 | Adamson | H04R 3/12 381/58 |

* cited by examiner

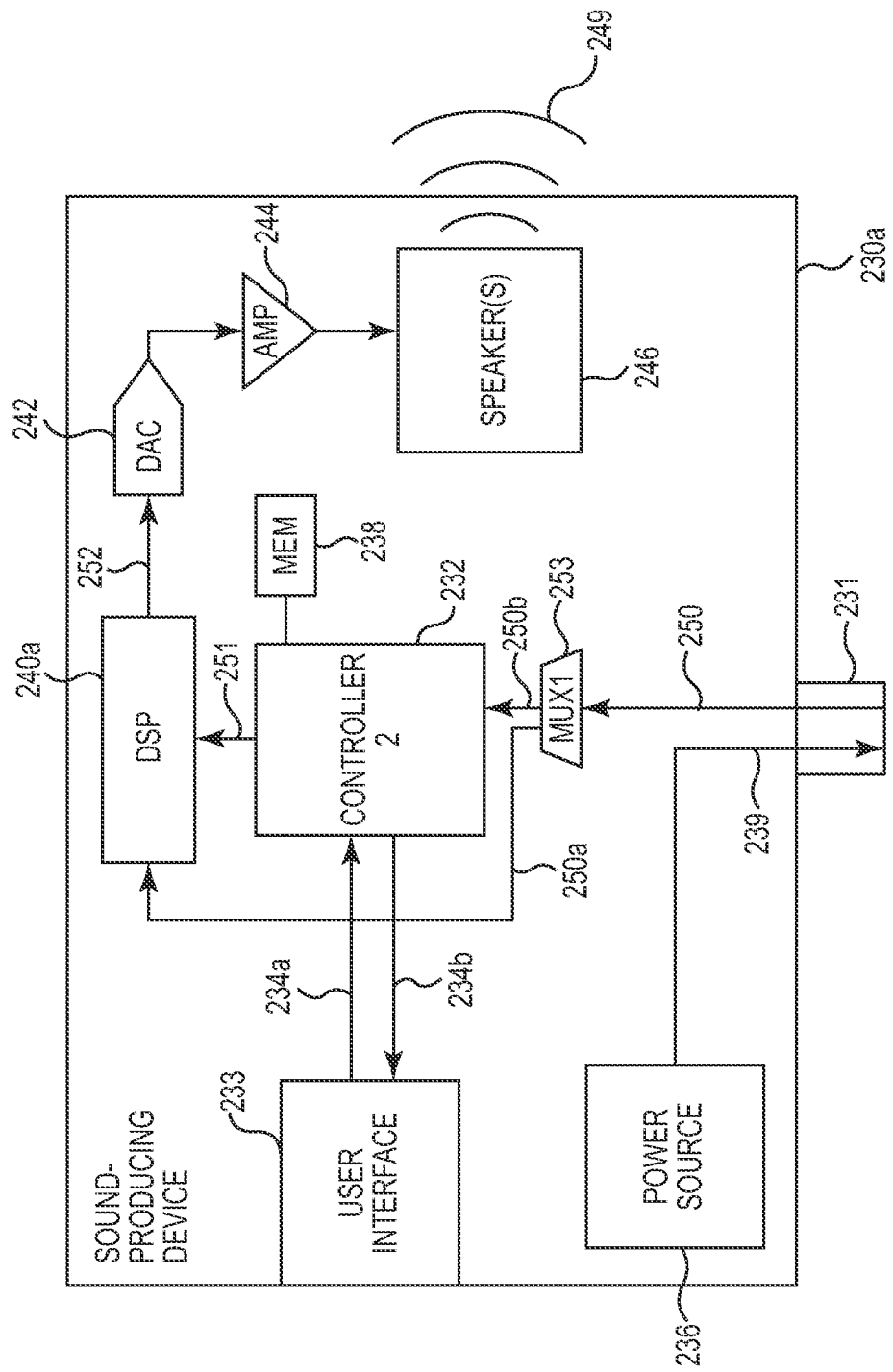

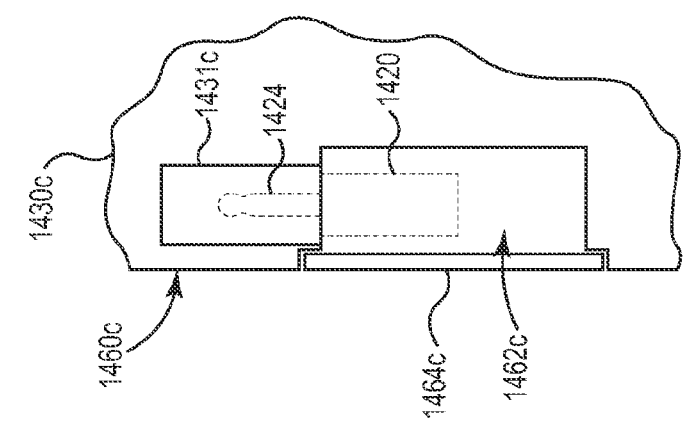
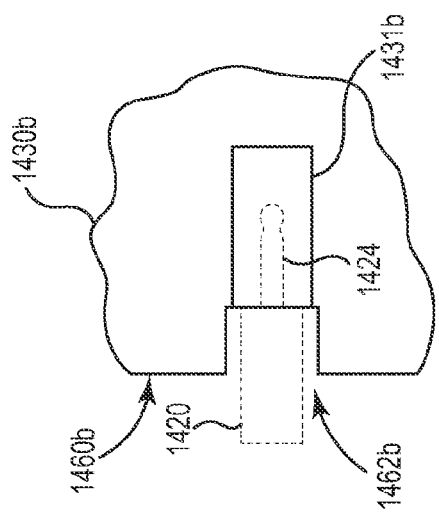
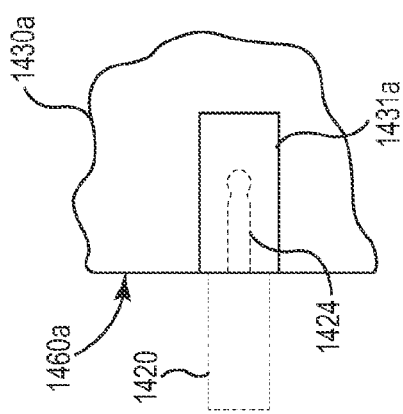

ADAPTABLE AUDIO SYSTEMS

CROSS REFERENCE TO RELATED APPLICATIONS

This application claims the benefit under 35 U.S.C. §119 (e) of pending U.S. provisional application 62/035,931, filed Aug. 11, 2014, which provisional application is incorporated herein by reference.

BACKGROUND

Electronic audio systems have been known for many decades. Over those decades, such systems have undergone many changes in performance, function, and styling.

Many modern audio systems have a distributed system architecture. That is, the source or generator of the audio signal is physically separated from the sound-producing device. The audio source may for example be a radio receiver, a CD player, a handheld MP3 player or other similar portable music player, a mobile phone, or a tablet, laptop, or other type of computer. The sound-producing device may for example be a loudspeaker unit or headphone set or other head-mounted unit, including one or more earbud. The audio signal travels from the audio source to the sound-producing device via a given one of many known wired or wireless communication paths. The audio source formats the audio signal in a particular manner that can be "understood" (used) by the intended sound-producing device. Many different audio data formats are known, and are broadly separable into analog and digital formats, and/or wired or wireless formats. The format may be for example raw analog audio, or USB digital, or Bluetooth™, or Wi-Fi™ format. USB refers to the Universal Serial Bus standard, of which there are several versions including version 1.1, 2.0, and 3.0.

Many audio products today have most of the technology "built-in" to the product. For example, if someone wants to play music wirelessly from a Bluetooth-equipped smartphone to a headphone set, they would buy a Bluetooth headphone set, go through the setup process to establish a communication link from the smartphone to the headphone set, and then listen to the music generated by the smartphone remotely on the headphone set. In other cases the person may want to play the music on a wireless loudspeaker unit. If the person later replaces their smartphone with a new smartphone that does not support Bluetooth but does support a different wireless protocol, e.g., Wi-Fi or WiMAX, or that supports a new version of Bluetooth but not an older Bluetooth version resident on the loudspeaker or headphone, they would have to buy another headphone set or loudspeaker unit that had the new wireless protocol built-in. The originally purchased headphones or loudspeaker would have to be set aside, ultimately becoming obsolete.

SUMMARY

We have developed a family of audio devices and systems that are adaptable to changing or differing audio formats and communication protocols on the part of the audio source. By being adaptable, they are less prone to becoming obsolete or useless when a new or different audio signal format is introduced.

In short, we have achieved this by separating the functionality between the sound-producing device and an external interface that is specifically designed to removably mate with the sound-producing device, e.g. by simply plugging into the sound-producing device, the external interface also preferably being physically small and compact relative to the sound-producing device. The external interface converts a given audio-encoded signal to a conditioned audio-encoded signal, the latter signal being compatible with the sound-producing device. If and when the user wishes to use another audio source that produces a different audio-encoded signal, which is not compatible with the sound-producing device/external interface combination (or with the sound-producing device by itself), the external interface is unplugged from the sound-producing device and replaced with a different external interface. The different external interface converts the different audio-encoded signal to the same or similar conditioned audio-encoded signal as before, such that the sound-producing device in combination with the different external interface is able to receive and process the different audio-encoded signal. In this way the sound-producing device maintains its functionality with the new signal encoding, and is not rendered obsolete.

Sound-producing devices such as headphone sets, loudspeaker units, and the like are therefore disclosed that can removably mate with an external interface. The external interface may for example plug into a port proximate an exterior of the sound-producing device. The external interface includes signal conversion circuitry that is powered by a power source in the sound-producing device. The external interface receives a first audio-encoded signal from a source device such as a mobile phone, tablet computer, or the like, and converts the received signal to a conditioned signal which is compatible with the sound-producing device. Connection between the source device and the external interface may be a first type of wired or wireless connection. The sound-producing device may be made to operate with other source devices that produce different audio-encoded signals by unplugging the external interface and replacing it with a different external interface whose conversion circuitry converts the different audio-encoded signal to the same or similar conditioned signal.

We therefore describe herein, among other things, systems that include a sound-producing device and an external interface. The sound-producing device includes a power source, an audio transducer, a digital controller, and a first electronic coupling member such as a female connector with multiple pins or contacts. The digital controller is coupled to the power source, and has an input coupled to the first electronic coupling member and an output coupled to the audio transducer. The external interface includes signal conversion circuitry and a second electronic coupling member such as a male connector adapted to mate with the female connector, the signal conversion circuitry adapted to convert a first audio-encoded signal to a conditioned audio-encoded signal, the conditioned audio-encoded signal being compatible with the sound-producing device (and in some cases with the digital controller) but the first audio-encoded signal not being compatible with the sound-producing device (or its digital controller). The second electronic coupling member is configured to removably mate with the first electronic coupling member. The power source in the sound-producing device powers the signal conversion circuitry in the external interface through the first and second electronic coupling members. The external interface may provide the conditioned audio-encoded signal to the input of the digital controller, or instead to a different circuit component within the sound-producing device, through the first and second electronic coupling members.

The first and second electronic coupling members may be or include a jack and plug combination, and the jack and plug may each include (or may have exactly) four conductors, two of which are used to supply electrical power from the sound-producing device to the external interface, and two of which are used for data transmission between the sound-producing device and the external interface. The jack may be or include a 2.5 mm audio jack.

The sound-producing device may have an exterior, and the first electronic coupling member may be disposed proximate the exterior. The audio transducer may be or include an electromagnetic speaker, an electrostatic speaker, or a piezoelectric speaker. The sound-producing device may be or include headphones, or it may be or include a loudspeaker unit. The sound-producing device may also include a digital signal processor (DSP) connected to the output of the digital controller, and the output of the digital controller may couple to the audio transducer through the DSP. The power source may be or include a transformer adapted to receive line power. The power source may also be or include a battery, including a rechargeable battery. The sound-producing device may also have a housing in which the audio transducer, the power source, the digital controller, the first electronic coupling member, the DSP, and other audio components are disposed. In some cases, in addition to being able to receive an audio signal through the first electronic coupling member, the sound-producing device may also include a wireless receiver or transceiver (e.g., a Bluetooth transceiver) within such housing, to allow the sound-producing device to receive an audio signal using such wireless receiver/transceiver and to play (process) such audio signal on the audio transducer.

The external interface may be configured to receive the first audio-encoded signal through a wired connection. For example, the wired connection may comprise conductive metal wires, and the first audio-encoded signal may have a digital USB format, or a simple analog (e.g. line level) format. Alternatively, the wired connection may comprise an optical fiber or fiber optic cable, and the first audio-encoded signal may have a digital (and optical) format. The external interface may instead be configured to receive the first audio-encoded signal through a wireless connection, and the external interface may then include an antenna for receiving such a signal. The first audio-encoded signal may have a Bluetooth format, or a Wi-Fi format, or a WiMAX format. The conditioned audio-encoded signal may be or include a digitally encoded audio signal.

The system may also include a source device configured to generate the first audio-encoded signal. The system may further include a second external interface comprising second signal conversion circuitry and a third electronic coupling member, the second conversion circuitry being adapted to convert a second audio-encoded signal to the conditioned audio-encoded signal, the second audio-encoded signal not being compatible with the sound-producing device, and the third electronic coupling member being configured to removably mate with the first electronic coupling member. The first-mentioned external interface can be mated with the sound-producing device to produce a first combination that is responsive to the first audio-encoded signal but not the second audio-encoded signal, and the second external interface can be mated with the sound-producing device to produce a second combination that is responsive to the second audio-encoded signal but not the first audio-encoded signal.

We also describe external interfaces designed for removable connection to sound-producing devices, such an external interface including an electronic coupling member configured to removably mate with another electrical coupling member, the electronic coupling member preferably being a 2.5 mm audio connector. The external interface also includes signal conversion circuitry adapted to convert a first audio-encoded signal to a conditioned audio-encoded signal. The external interface is configured to receive electrical power, and transmit the conditioned audio-encoded signal, through the electronic coupling member, and the signal conversion circuitry is powered by the received electrical power.

In cases where the electronic coupling member is a 2.5 mm audio connector or the like, the electronic coupling member is or includes a jack or plug having four conductors, two of which are used to supply electrical power to the external interface, and two of which are used for data transmission to transmit the conditioned audio-encoded signal. The conditioned audio-encoded signal may have a digital encoding format and the first audio-encoded signal may have an analog encoding format, or vice versa. Alternatively, the first and conditioned audio-encoded signals may have different digital encoding formats, or different analog encoding formats. The external interface may be configured to receive the first audio-encoded signal through a wired connection, or wirelessly.

A system may include such an external interface, and the sound-producing device, wherein the sound-producing device is compatible with the conditioned audio-encoded signal but not the first audio-encoded signal. The system may also include a source device configured to generate the first audio-encoded signal.

We also describe sound-producing devices that include an audio transducer, a power source, a first electronic coupling member configured to removably mate with a second electronic coupling member, a digital controller coupled to the power source and having an input coupled to the first electronic coupling member and an output coupled to the audio transducer, and a memory coupled to the digital controller, the memory containing an ID code. The sound-producing device may be configured to provide electrical power from the power source through the first electronic coupling member. The digital controller may be configured to (a) receive an ID signal (and optionally a conditioned audio-encoded signal) through the first electronic coupling member, the conditioned audio-encoded signal being compatible with the sound-producing device (e.g. in some cases with the digital controller), and (b) compare the ID signal to the ID code in the memory, and (c) provide a full functionality if the comparison produces a match, and provide a reduced functionality if the comparison does not produce a match.

The full functionality may include providing an audio output signal, corresponding to the conditioned audio-encoded signal, to the audio transducer, and the reduced functionality may include not providing the audio output signal to the audio transducer. The device may be or include a head-mounted unit such as a headphone set. The device may be or include a loudspeaker unit. The device may have an exterior, and the first electronic coupling member may be disposed proximate the exterior. The audio transducer may be or include an electromagnetic speaker, an electrostatic speaker, or a piezoelectric speaker. The device may also include a digital signal processor (DSP) and/or a digital-to-analog converter (DAC) connected to the output of the digital controller, the output of the digital controller coupling to the audio transducer through the DSP and/or the DAC. The power source may include a transformer adapted to receive line power, and/or a battery, including a rechargeable battery.

The digital controller may be configured to select one of at least two different operating configurations as a function of what signal is provided at the first electronic coupling member. The at least two different operating configurations may include a first operating configuration in which the device operates as a USB device, and a second operating configuration in which the device operates as a USB host. The digital controller may be configured to select one of three different operating configurations as a function of what signal is provided at the first electronic coupling member.

A system may include such a sound-producing device, and a first external interface that includes first signal conversion circuitry and the second electronic coupling member, the first signal conversion circuitry being adapted to convert a first audio-encoded signal to the conditioned audio-encoded signal, the first audio-encoded signal not being compatible with the sound-producing device. The power source in the sound-producing device may power the first signal conversion circuitry in the first external interface through the first and second electronic coupling members. The first external interface may provide the conditioned audio-encoded signal to the input of the digital controller, or to another component of the sound-producing device, through the first and second electronic coupling members. The first external interface may be configured to receive the first audio-encoded signal through a wired connection, or through a wireless connection. The conditioned audio-encoded signal may be or include a digitally encoded audio signal. The system may also include a source device configured to generate the first audio-encoded signal. The system may further include a second external interface including second signal conversion circuitry and a third electronic coupling member, the second conversion circuitry being adapted to convert a second audio-encoded signal to the conditioned audio-encoded signal, the second audio-encoded signal not being compatible with the sound-producing device, and the third electronic coupling member also being configured to removably mate with the first electronic coupling member. The first external interface can be mated with the sound-producing device to produce a first combination that is responsive to the first audio-encoded signal but not the second audio-encoded signal, and the second external interface can be mated with the sound-producing device to produce a second combination that is responsive to the second audio-encoded signal but not the first audio-encoded signal.

At least some of the disclosed sound-producing devices may be used independently, e.g., with a suitable source device but without any of the disclosed external interfaces. In some cases, the sound-producing device may include one or more internal multiplexers or other switch or switches so that an incoming audio signal received at two or more contacts of the electronic coupling member can (in one state of the switch) be directed to the digital controller, or to instead (in another state of the switch) bypass the digital controller and be directed to another electronic component, such as a signal processor. For example, the switch may direct the incoming audio signal to the digital controller when the incoming audio signal is digital, and direct the incoming audio signal to the signal processor when the incoming audio signal is analog.

Thus, for example, a sound-producing device may include a housing, and an audio transducer, a digital controller, a signal processor, and a switch may be disposed within the housing. The signal processor may be coupled to the digital controller and may have an analog audio input, a digital audio input, and an audio output, the audio output coupled to the audio transducer. The sound-producing device may also include an audio jack suitable for removable connection to an audio plug, the audio jack being disposed proximate an exterior of the housing and comprising two conductive contacts to receive an audio signal. The switch may comprise a switch input, a first switch output, and a second switch output, the switch input coupled to the audio jack to receive the audio signal from the two conductive contacts, the first switch output coupled to the digital input of the signal processor through the digital controller, and the second switch output coupled to the analog input of the signal processor but bypassing the digital controller. In a first switch state, the switch may connect the switch input to the first switch output but not to the second switch output, and in a second switch state, the switch may connect the switch input to the second switch output but not to the first switch output.

Other aspects of the invention can be found in the appended claims and the detailed description that follows.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The accompanying drawings are incorporated in and constitute a part of this application and, together with the description, explain the principles and advantages of the invention. In the drawings.

FIGS. 2A and 2B are schematic block diagrams of alternative sound-producing devices to the one shown in FIG. 2;

FIGS. 14A through 14C are schematic side or cross-sectional views of different configurations of the exterior surface and electronic coupling member of sound-producing devices to receive the external interface in different ways;

In the figures, like reference numerals designate like elements.

DETAILED DESCRIPTION

As summarized above, we have developed a new class of audio devices and systems that are adaptable to changing or differing audio formats and/or communication protocols on the part of the audio source. By being adaptable, the sound-producing devices, such as headphones and loudspeaker units, are less prone to becoming obsolete or useless when a new or different audio signal format is introduced.

Figure 1:
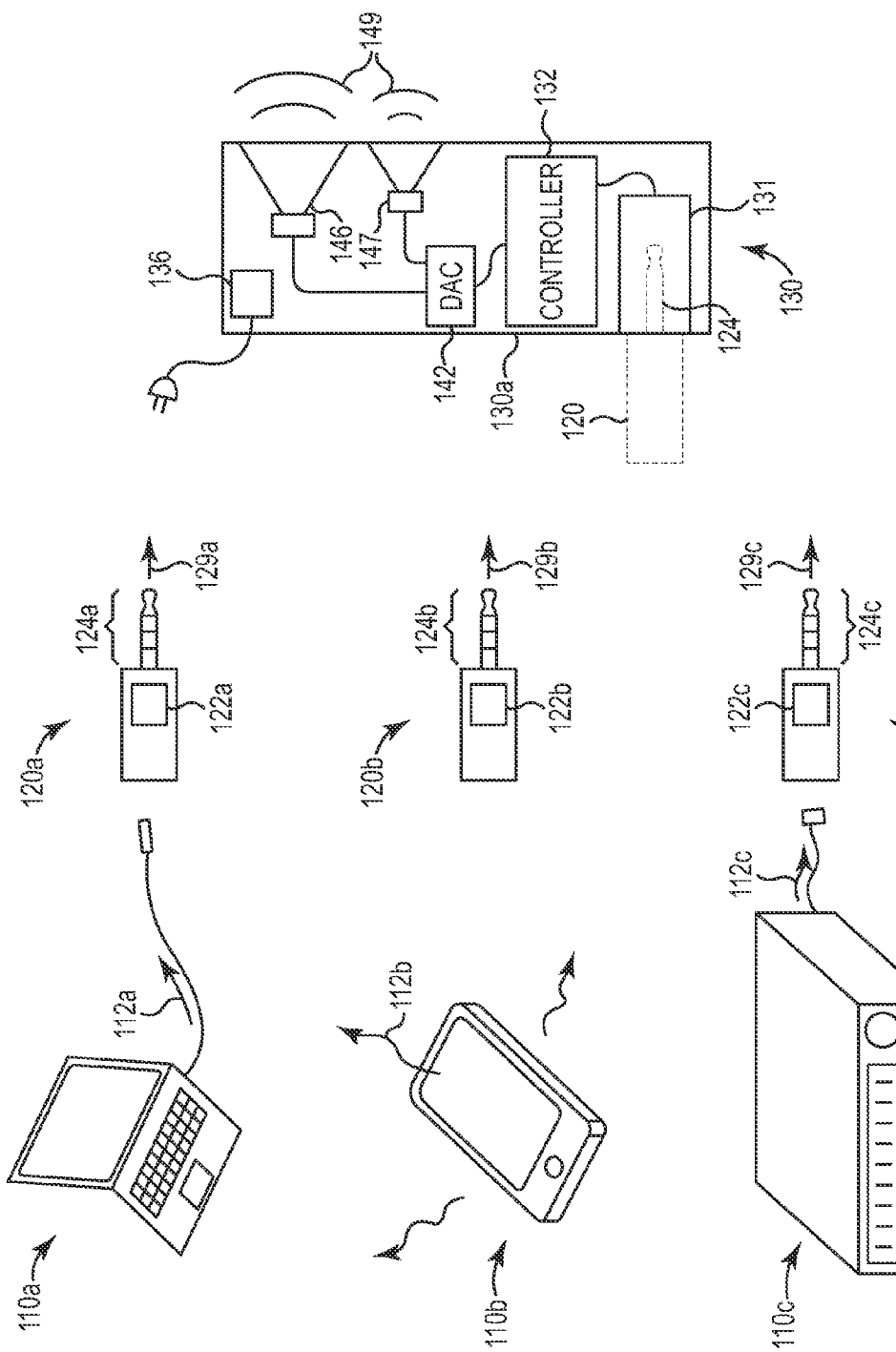
FIG. 1 is a schematic view of a number of different audio sources and different external interfaces that can be used to produce different audio systems using a single sound-producing device.

FIG. 1 illustrates one aspect of the broad concept by depicting a sound-producing device 130, three different external interfaces 120a, 120b, 120c, and three different audio sources 110a, 110b, 110c. For purposes of this illustration we assume the audio source 110a is a laptop computer, the audio source 110b is a smartphone or other handheld electronic device with wireless broadcasting capability, and audio source 110c is a high fidelity radio receiver or other high fidelity audio amplifier unit. Other known audio sources may of course also be used. Furthermore, in some cases a given audio source can produce two or more different types of audio-encoded signals. Some smartphones can for example provide a wired analog audio output from a 3-conductor 3.5 mm jack, and can also provide a wireless Bluetooth audio output.

We also assume the three audio sources 110a, 110b, 110c produce respective audio-encoded signals 112a, 112b, 112c which are substantially different from each other. By this we mean the signals are encoded in substantially different formats, e.g., an audio designer of ordinary skill would not expect all the formats to be compatible with the same sound-producing device. Despite this, the sound-producing device 130 is capable of producing high fidelity sound 149 for each of the audio-encoded signals. This is because the device 130 is specifically designed to be easily combined with a removable external interface 120, different external interfaces being designed to ensure full functionality of the device 130/interface 120 combination for the different audio encoding formats. The external interface 120 receives the audio-encoded signal from the audio source and converts that signal to a different audio-encoded signal that is compatible with the sound-producing device 130. We refer to the latter signal, which is compatible with the device 130, as a "conditioned" audio-encoded signal. The external interface 120 therefore receives a particular audio-encoded signal and generates the conditioned signal, the conditioned signal having a different audio encoding than the particular signal but otherwise accurately reproducing the audio information in the particular input signal with high fidelity. The audio information in the audio-encoded signals is typically characterized by the human audible frequency band from about 20 to 20,000 Hz.

For fast and easy removal and replacement of external interfaces, the external interface 120 includes an electronic coupling member 124 which is configured to removably mate with a complementary electronic coupling member 131 on the sound-producing device 130. The electronic coupling members may for example be one of the many known male-female electronic connectors that can be physically connected by simply pushing them together, and disconnected by simply pulling them apart. Each of the electronic coupling members has a plurality of separate electrical contacts, such that multiple electrically conductive paths (corresponding to the number of electrical contacts on each electronic coupling member) are established between the device 130 and the interface 120. In exemplary embodiments, at least 3, or at least 4, or exactly 4 such electrically conductive paths are established, although more than 4 conductive paths, e.g. 5 or 6 conductive paths, can also be used if desired. For simplicity and robustness, the number of conductive paths defined by the electronic coupling members is desirably kept to a minimum, e.g., no more than 10, or no more than 8, or no more than 6, or no more than 4, or exactly 4.

Of particular interest for the electronic coupling member 124 is a conventional 4-conductor sub-miniature (2.5 mm diameter) electrical plug, as depicted schematically below in FIG. 3. There are several reasons why the 2.5 mm standard audio plug—and a mating 2.5 mm audio jack for use as the electronic coupling member 131 in the sound-producing device—is particularly well suited for use in the disclosed devices, relative to other types of electronic connectors. In particular, the 2.5 mm sub-miniature connector is easy to connect and disconnect, and because of the rotational symmetry about its longitudinal axis, it cannot be connected backwards or upside down; has been used reliably in audio applications for several decades; has exactly 4 conductive paths or contacts, which is well suited to many of the disclosed devices and systems; and is physically smaller than the connector size used for power audio jacks and plugs, to prevent a user from damaging the sound-producing device by mistakenly connecting it to a high power audio signal on a physically larger audio plug. In spite of these benefits or potential benefits of the 2.5 mm standard audio connector, the reader will understand that alternative plug and jack types, whether now known or later developed, can be used instead.

In order to make the sound-producing device 130 responsive to the audio-encoded signals from each of the audio sources 110a, 110b, 110c, three external interfaces 120a, 120b, 120c are provided. These interfaces include signal conversion circuitry 122a, 122b, 122c as shown to perform the conversion of the input audio encoding to the conditioned audio encoding. That is, the signal conversion circuitry 122a in external interface 120a converts the audio-encoded signal 112a to a conditioned audio-encoded signal 129a, and the signal conversion circuitry 122b in external interface 120b converts the audio-encoded signal 112b to a conditioned audio-encoded signal 129b, and the signal conversion circuitry 122c in external interface 120c converts the audio-encoded signal 112c to a conditioned audio-encoded signal 129c. To make the sound-producing device 130 operate with the audio source 110a, the external interface 120a is plugged into the electronic coupling member 131, and the audio-encoded signal 112a is provided to the interface 120a via the electrical cable which extends from the audio source 110a. To make the sound-producing device 130 operate with the audio source 110b, the external interface 120a is removed, the external interface 120b is plugged into the electronic coupling member 131, and the audio-encoded signal 112b is provided to the interface 120b via an antenna in the interface 120b that detects the radio-frequency electromagnetic waves emanating from the audio source 110b. (The wireless audio-encoded signal emitted by the audio source may alternatively be or comprise a modulated electromagnetic wave at optical frequencies, e.g., a modulated infrared beam. Alternatively, in an embodiment that uses a wired connection, the wired connection may comprise an optical fiber or fiber optic cable that transmits a modulated optical signal or beam.) To make the sound-producing device 130 operate with the audio source 110c, the external interface 120b is removed, the external interface 120c is plugged into the electronic coupling member 131, and the audio-encoded signal 112c is provided to the interface 120c via the electrical cable which extends from the audio source 110c. The external interfaces 120a, 120b, 120c communicate their respective conditioned audio-encoded signals 129a, 129b, 129c to the sound-producing device 130 via one or more conductive paths on their respective electronic coupling members 124a, 124b, 124c. These electronic coupling members are shown in the figure as 4-conductor 2.5 mm plugs, but other physical configurations can also be used as discussed above.

Some of the components and elements of the sound-producing device 130 are shown in FIG. 1. The electronic coupling member 131 has already been discussed. The coupling member 131 is desirably disposed proximate, i.e., at or near, an exterior surface 130a of the device 130 to facilitate plugging and unplugging external interfaces 120 into and out of the device 130. The coupling member 131 connects to an input of a digital controller 132 or other suitable controller of the device 130. In the depicted embodiment this is a direct connection, but in other embodiments the coupling member 131 may connect to the digital controller 132 through one or more other electronic circuit components. The digital controller 132 may include or connect to a digital signal processor to allow for specific tuning of the audio frequency response curve and the ability to produce high quality output sound. The digital controller 132 processes the conditioned audio-encoded signal from the external interface 120 and feeds the signal to audio transducer(s) through a digital-to-analog converter (DAC) 142. The DAC 142 connects to one or more audio transducers 146, 147 and ensures the audio signals sent to the transducer(s) are analog. A given transducer 146, 147 is commonly referred to as a "speaker", and may be of any suitable design. An audio transducer may for example be or include a magnetic (electromagnet) speaker, a piezoelectric speaker, and/or an electrostatic speaker. The audio transducer may also be or include a speaker commonly referred to as a "super tweeter", "tweeter", "midrange", "woofer", and/or "sub-woofer" speaker. The transducers 146, 147 convert the received analog signals from electrical to audible sound 149, the sound 149 substantially matching the audio content of the audio-encoded signal from the audio source with high fidelity. In some cases the sound-producing device 130 may have only one audio transducer (speaker), or it may have two, or three, or more. Typically, an amplifier is (or multiple amplifiers are) provided between the DAC 142 and the audio transducer(s) so the audio signal is strong enough to drive the selected transducer(s).

For purposes of the present application, in order to clearly distinguish an individual audio transducer from a piece of audio equipment in which one or more such transducers is mounted or enclosed in a frame, box, or other housing suitable for placement on a floor, shelf, desktop, or the like, such a piece of audio equipment is referred to herein as a "loudspeaker" or "loudspeaker unit", whereas the individual audio transducer is referred to as a "speaker".

The sound-producing device 130 also includes a power source 136. The power source 136 preferably provides the electrical power needed to operate all or substantially all electrical components in the sound-producing device, including e.g. the controller 132, the DAC 142, and the amplifier that drives the audio transducer(s) 146, 147. The number and type of audio transducers used (and the type of amplifier needed to drive those transducers) typically has a major impact on the total electrical power needs of the device 130, and thus also has a major impact on the design of the power source 136. For a headphone set with one speaker per ear (e.g. two low power speakers total), a battery or set of batteries may suffice for the power source 136. The battery is preferably rechargeable so the user is not inconvenienced with having to replace batteries. For a loudspeaker unit, which typically has larger, more powerful speakers, batteries alone may be insufficient for some embodiments, and the power source may in those cases be or comprise an adapter, transformer, or the like that connects to electrical line power such as through a wall outlet. In some cases, for flexibility of operation, the power source 136 may include both one or more (rechargeable) battery and a connection to electrical line power.

In addition to providing the electrical power needed for the electrical components in the sound-producing device 130, the power source 136 also preferably provides power to the signal conversion circuitry (see e.g. 122a, 122b, 122c), and/or other electrical components located in the external interface 120, when the interface 120 is connected to the device 130 by the mated electronic coupling members 124, 131.

Turning our attention back to the controller 132, the controller may be configured to process a particular type of audio-encoded signal, which we refer to as a conditioned audio-encoded signal, and which we describe as being compatible with the controller 132. When the audio source supplies an audio-encoded signal that is not compatible with the controller 132, the signal conversion circuitry of the external interface 120 is needed to convert the initial audio-encoded signal to the conditioned audio-encoded signal. However, depending on the design of the controller 132, in some cases the audio source may supply an audio-encoded signal that is already compatible with the controller 132, i.e., the signal supplied by the audio source may already be a "conditioned" audio-encoded signal. For example, in some embodiments, the controller 132 can include a conventional module for processing digital USB-encoded audio signals, such that the conditioned audio-encoded signal is a digital USB-encoded audio signal. In such cases, an audio source that supplies a digital USB-encoded audio signal, e.g. on a connectorized USB cable, requires no further conditioning or signal conversion by the external interface 120. If the connector at the end of the USB cable is compatible with the electrical coupling member 131 on the sound-producing device 130, such connector can be plugged directly into the coupling member 131 without any external interface 120 so that the USB cable makes a direct connection from the audio source to the sound-producing device. However, if the connector at the end of the USB cable is not compatible with the electrical coupling member 131, i.e. if they cannot be physically mated together, then the external interface 120 may be replaced with a "pass-through interface". Such a pass-through interface may have the same physical appearance and outer dimensions as one of the external interfaces 120, but it contains no active electronics, and in particular no signal conversion circuitry. The pass-through interface may only contain simple wires or conductors that adapt one connector type to another.

Also, in some cases, the controller 132 can be designed to process more than one type of audio-encoded signal, such that it is compatible with a first conditioned audio-encoded signal as well as a different second conditioned audio-encoded signal. For example, a digital controller such as an application-specific integrated circuit (ASIC), a field-programmable gate array (FPGA), a stored-program microprocessor or microcontroller, and/or other suitably configured circuit(s) can be made to process both digital USB-encoded audio signals and conventional analog audio signals. (In exemplary embodiments, a microprocessor or microcontroller can include or couple to an analog switch IC identified by Fairchild part number FSA221MUX to achieve the dual (analog and USB digital) signal functionality.) In such cases, as described below, the controller 132 can be provided with an interface detection capability to determine what type of audio-encoded signal is being supplied to it, and/or whether an external interface 120, whose circuitry requires power from the power source 136, is attached to the electrical coupling member 131, or whether a pass-through interface, which does not require power from the power source 136, is attached to the electrical coupling member 131, and to respond accordingly.

In some cases, described further below, the conditioned audio-encoded signal may be incompatible with the controller 132, but compatible with another electronic device within the sound-producing device 130, such as a signal processor. A switch may then be provided to direct an incoming conditioned audio-encoded signal alternately to the controller 132 or to the signal processor or other electronic device as appropriate so that the sound-producing device can play or process the conditioned audio-encoded signal.

Figure 2:
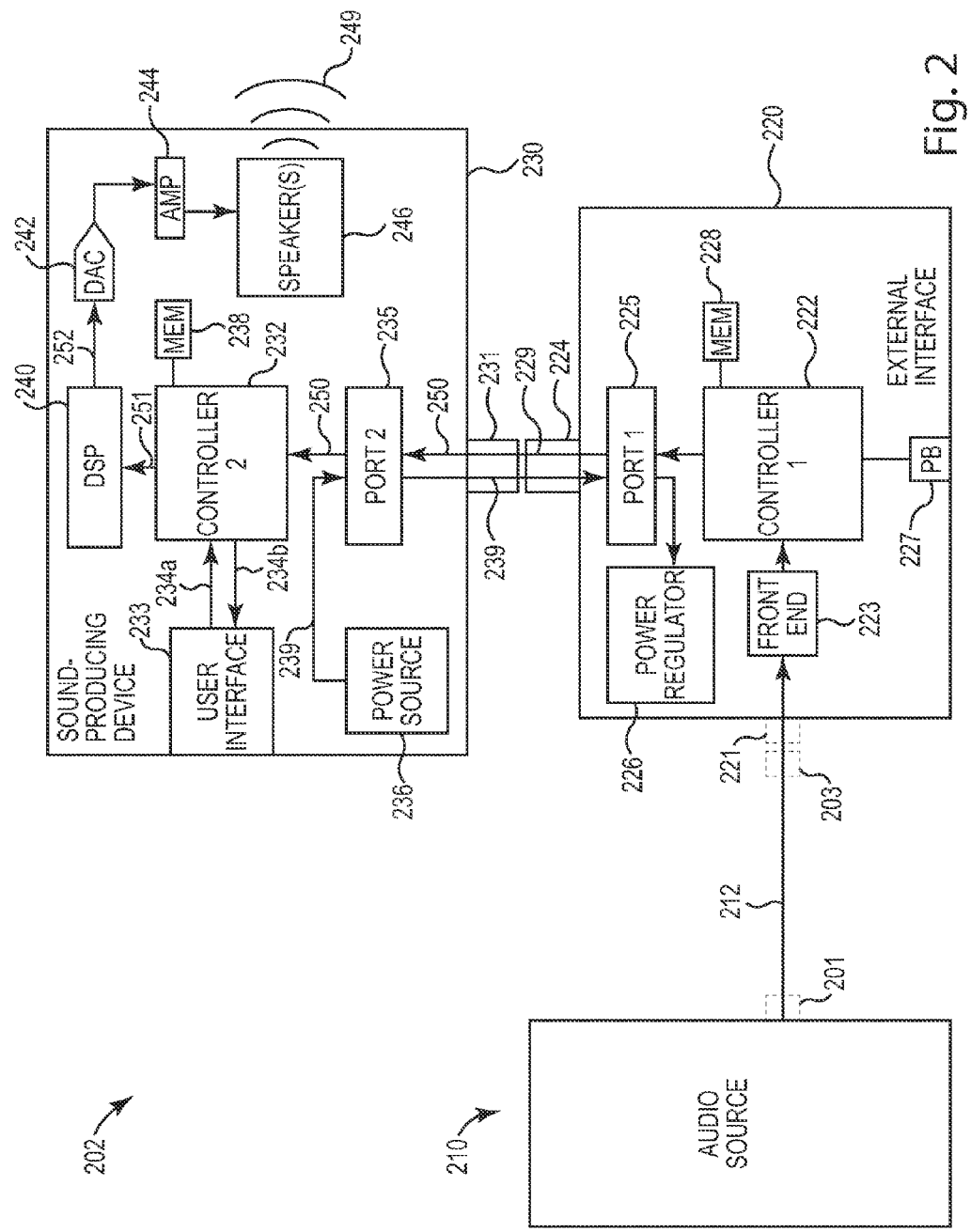
FIG. 2 is schematic block diagram of an audio system that includes an audio source, an external interface, and a sound-producing device.

Turning now to FIG. 2, we see there an audio system 202 that includes an audio source 210, an external interface 220, and a sound-producing device 230. The audio source 210 may be the same as or similar to the audio sources discussed above. The audio source 210 provides a first audio-encoded signal 212 to the interface 220. The signal 212 is assumed to have an audio format that is not compatible with the sound-producing device 230. The signal 212 may be communicated wirelessly or by a wired connection to the external interface 220. In the latter case, a detachable cable or wire may be used having electronic or optical coupling members 201, 203 on opposite ends thereof as shown, and the coupling member 203 may be adapted to removably mate with an electronic or optical coupling member 221 that is part of the external interface 220. For example, in some cases the coupling member 201 may be a USB Standard-A plug, and the coupling member 203 may be a USB Mini-B plug. In other cases the coupling member 201 may be replaced with a 3-conductor 3.5 mm plug, or with an Ethernet plug, or with a Firewire™ plug, for example.

The audio-encoded signal 212 is received at a front end 223 of the external interface 220, and through the coupling member 221 if present. The front end 223 may be or include a physical layer interface. The front end 223 may also include a radio frequency (RF) antenna if the external interface 220 is designed to receive audio-encoded signals wirelessly, or it may include an optical detector if the external interface is designed to receive audio-encoded signals optically. The external interface 220 may be the same as or similar to the external interfaces discussed above.

The audio-encoded signal 212 then passes from the front end 223 to a digital controller 222 or other suitable controller or other circuit component (e.g. even in some cases an analog or digital amplifier or attenuator) that requires electrical power to operate. The controller 222 may for example be or include an ASIC, FPGA, stored-program microprocessor or microcontroller, or other suitably configured circuit. The controller 222 includes signal conversion circuitry discussed above that converts or reformats the first audio-encoded signal 212 to an audio-encoded signal that is compatible with the sound-producing device 230, i.e., to a conditioned audio-encoded signal. Such a conditioned audio-encoded signal is shown in FIG. 2 as signal 229 after passing through a port 225. To accomplish this function, the signal conversion circuitry may be or include a stored-program microcontroller, with suitably configured firmware that reads audio data of the first format into memory, reformats the data to the "conditioned" format or protocol, and writes the reformatted data as the conditioned audio-encoded signal. In some embodiments, as discussed above, the conditioned audio-encoded signal, which is produced by the signal conversion circuitry within the controller 222 and communicated to the sound-producing device over the electronic coupling members 224, 231, is in the form of a digital USB-encoded audio signal, for example, USB version 1.1. As such, the conditioned audio-encoded signal may utilize differential signaling for high immunity to electrical noise, with a maximum differential voltage of 4.5 volts, a minimum differential voltage of 0.65 volts, a data rate of 12 megabits per second (Mbps), and the data transmitted in digital form in packets. Packet length may depend on the type of packet and the quantity of data being passed. The 12 Mbps data rate is fully adequate to handle two channels (e.g. a left channel and a right channel) of 96 k, 24-bit audio data. The USB 1.1 encoding is compatible with both USB 1.1 and USB 2.0 Hosts.

Besides audio-encoded information or data, the audio source 210 may also transmit other information, such as control information, to the external interface 220 and sound-producing device 230 over the same wired or wireless connection as the audio-encoded signal 212. Such control information may include for example "volume up", "volume down", and "volume mute" commands that are sent when the user activates corresponding buttons or touch-screen button icons on the audio source 220. Such command information is conveyed from the audio source 210 to the external interface 220 and then to the digital controller of the sound-producing device 230. The digital controller of the sound-producing device 230 can also respond to the same or similar control information that originates from a user interface on the sound-producing device, discussed further below. Control information from sound adjustments made via the user interface, or other control information originating from the sound-producing device 230, may be communicated from such digital controller back to the audio source 210 on the same wired or wireless connection as that used by the audio-encoded signal 212, so that, for example, a sound bar or other visual volume indicator on the audio source 210 may be appropriately updated when the user adjusts the volume using the user interface on the sound-producing device.

The controller 222 may also include, and/or couple to, a memory 228 for storing parameters that are used in the operation of the external interface 220. The memory may include volatile (read/write) memory, non-volatile (read/write) memory, and permanent (read only) memory. In some cases, the stored parameters may include an identification (ID) code that identifies a manufacturer, such as the manufacturer of the external interface 220. This ID code, stored in permanent memory, may be communicated to the sound-producing device in some embodiments as described further below. Other codes and protocol information that are used in known systems and devices may also be stored as parameters in the memory 228. The stored parameters may also include an encryption key.

A power regulator 226 connects to the port 225 and distributes electrical power to the controller 222 and to all, or substantially all, other circuits and components within the external interface 220 that require electrical power to operate. Unlike the sound-producing device 230, the external interface 220 in exemplary embodiments contains no, or substantially no, source of electrical power; hence, the power regulator 226 is not a source of electrical power such as a battery or a line input. However, the power regulator 226 may regulate (e.g. clamp or up-convert or down-convert to a specific voltage level) and/or distribute power that it receives from the sound-producing device 230, such received power being indicated in the figure by power 239. The power 239, as well as the conditioned audio-encoded signal 229, are passed between the external interface 220 and the sound-producing device 230 through mated electronic coupling members 224, 231, which may be the same as or similar to the respective electronic coupling members 124, 131 discussed above. In some cases the sound-producing device 230 emulates a USB host relative to the external interface 220, and as such the device 230 may provide power 239 at about a 5 volt level. The power regulator 226 may then regulate the power down to one or more lower voltages, e.g., 3.3 volts, if such lower voltages are suitable for the operation of circuit components in the external interface 220. Such low voltage level circuit components may be desirable to the extent they use less electrical power than 5 volt components, thus reducing power draw from the battery or other power source in the sound-producing device.

In cases where the external interface 220 is designed for Bluetooth, Wi-Fi, or similar wireless audio data formats, the external interface 220 desirably includes a physical push-button 227 which is accessible from an exterior of the interface 220 so that a user can push the button as part of a conventional start-up procedure for configuring such wireless devices. The controller 222 couples to the push button 227 and detects when the push button is depressed or not. Although standards for data transmission formats are detailed and complex, and are often updated, revised, or superseded from time to time, we provide the following simplified aspects of some of the data transmission standards mentioned herein: Bluetooth is a digital wireless packet-based protocol with a master-slave structure, operating at nominally 2.4 GHz; Wi-Fi is a digital wireless protocol operating at nominally 2.4 GHz, and that uses orthogonal frequency-division multiplexing (OFDM) digital encoding on multiple carrier frequencies; WiMAX is a digital wireless protocol operating at nominally 2.5 GHz, and uses a scalable orthogonal frequency-division multiple access (SOFDMA) digital encoding; USB is a digital wired packet-based protocol having logical channels referred to as pipes.

The sound-producing device 230 may be the same as or similar to the sound-producing device 130 discussed above. The device 230 includes a power source 236 and a digital controller 232, which may be the same as or similar to the respective power source 136 and controller 132 discussed above. A port 235 may be included to pass the power 239 to the external interface 220 and to pass the conditioned audio-encoded signal 229 to the controller 232 on receiving electrical line or lines 250. Similar to controller 222, the controller 232 may also include, and/or couple to, a memory 238 for storing parameters that are used in the operation of the sound-producing device 230. The memory 238 may include volatile (read/write) memory, non-volatile (read/write) memory, and permanent (read only) memory. In some cases, the stored parameters may include an identification (ID) code that identifies a manufacturer, such as the manufacturer of the external interface 220 and/or the manufacturer of the sound-producing device. This ID code, stored in permanent memory, may be compared to an ID code from the external interface 220 as described further below. Other codes and protocol information, including information used in known systems and devices, may also be stored as parameters in the memory 238. Such additional stored parameters may include variable parameters that will be stored in non-volatile memory (such as EEPROM) so that they can be used again after subsequent power-up, such as the current volume level, the type of interface determined from an interface search (see e.g. FIG. 20 below), and/or an internet protocol (IP) address (e.g. if the external interface 220 receives data from the audio source by a Wi-Fi connection or by a wired Ethernet connection). The stored parameters may also include an encryption key.

The sound-producing device also desirably includes a user interface 233 that provides the controller 232 with status information over line 234a and/or that receives status information from the controller 232 over line 234b. The user interface may include one or more of: a volume control knob or mechanism; an on/off button or switch; and one or more individual LEDs, and/or liquid crystal displays or display elements, and/or any other suitable visual display element(s), that can be used as visual indicators of the status of the sound-producing device to the user. The volume control knob may be used to adjust the volume of the sound 249 emitted by the device 230. The setting of such a knob may be stored in memory 238 by the controller 232 so that after a power down/power up sequence, the device 230 returns to its previous volume or loudness setting. The on/off button may be used to completely power down all circuitry within the device 230 to preserve battery life. Alternatively, the same or different button may be used to partially power down the circuitry, e.g. to cause some or all circuit elements to operate at a reduced power sleep state. The LED(s) or other visual indicator(s) can be used to notify the user of the status of the device 230. For example, one indicator or group of indicators can be used to indicate an error or failure to receive a suitable audio signal from the external interface 220. The same or another indicator or group of indicators can be used to indicate battery status. Furthermore, for example, the visual indicator(s) may indicate what type of external interface is attached, e.g. by assigning a specific color, a specific on-state brightness (e.g. "dim on" and "bright on"), and/or a combination of color and brightness, to each external interface type. In some cases, the color red as a visual indicator may be reserved for error indications. During the power-up procedure of the sound-producing device, the visual indicators may be used to indicate which steps are being performed, or have been completed, in the initialization process. In the case of an external interface that couples to the audio source by a wireless connection (e.g., Wi-Fi), the visual indicators on the sound-producing device may be used to uniquely indicate procedural steps such as (1) attempting to connect to an access point, (2) connection achieved to the access point but searching for an audio source, (3) connection to access point achieved and audio source found but searching for the application, and (4) successfully connected to the application on the audio source and ready to play music. Finally, the visual indicators may also be used to provide an indication of the quality of the signal connection, e.g. on a scale of 1-3, or 1-5, or 1-10, or as otherwise desired.

The controller 232 may also include, or couple to, a digital signal processor (DSP) 240 for digitally processing the audio signal. The DSP 240 may be used to adjust the audio signal to the combination of the specific transducer(s) (speaker(s)) in the specific cabinet, such that the frequency response is smoother, flatter, and/or wider than would be provided by an uncompensated transducer/cabinet. More generically, the DSP 240 may be used as an equalizer to alter the frequency response of the audio signal on an output line 252 of the DSP relative to the audio signal received by the DSP on an input line 251, by amplifying and/or attenuating selected frequency bands relative to other frequency bands. The DSP 240 may also be used to limit the signal to prevent the harmonic distortion that can occur in the case where the incoming signal amplitude is beyond the linear response range of the amplifier and/or transducer. Specifications and characteristics of the DSP will depend on details of the intended application and user requirements, but in some embodiments a suitable DSP may include a stereo, low-power, audio codec with integrated phase locked loop (PLL) such as model ADAU1761 available from Analog Devices, Inc., or processors selected from the SigmaDSP™ family of products available from Analog Devices, Inc., or DSPs that are available from Texas Instruments Incorporated and Intersil Corporation.

The sound-producing device 230 may also include a DAC 242 which receives a digital output of the DSP 240 on line 252 and produces an analog output signal therefrom. The DAC 242 may in this regard be the same as or similar to the DAC 142 discussed above, and/or may be incorporated into the DSP 240. (For example, the ADAU1761 device referenced above includes multiple built-in DACs of high quality.) An amplifier 244 is connected between the DAC 242 and audio transducer(s) 246 as shown. The amplifier 244 amplifies the audio signal as a function of a control signal sent by the controller 232 to the amplifier. The amplified signal then reaches the audio transducer(s) 246, which may be the same as or similar to the audio transducers 146, 147 discussed above, and is transformed by the transducer(s) to high fidelity sound 249 representative of the first audio-encoded signal 212.

The sound-producing device 230 typically comprises a cabinet, headgear, or other housing within which all or substantially all of its component parts are contained. Without limitation, examples of such housings (or portions thereof) are depicted in FIGS. 8 through 14C below.

Figure 2B:
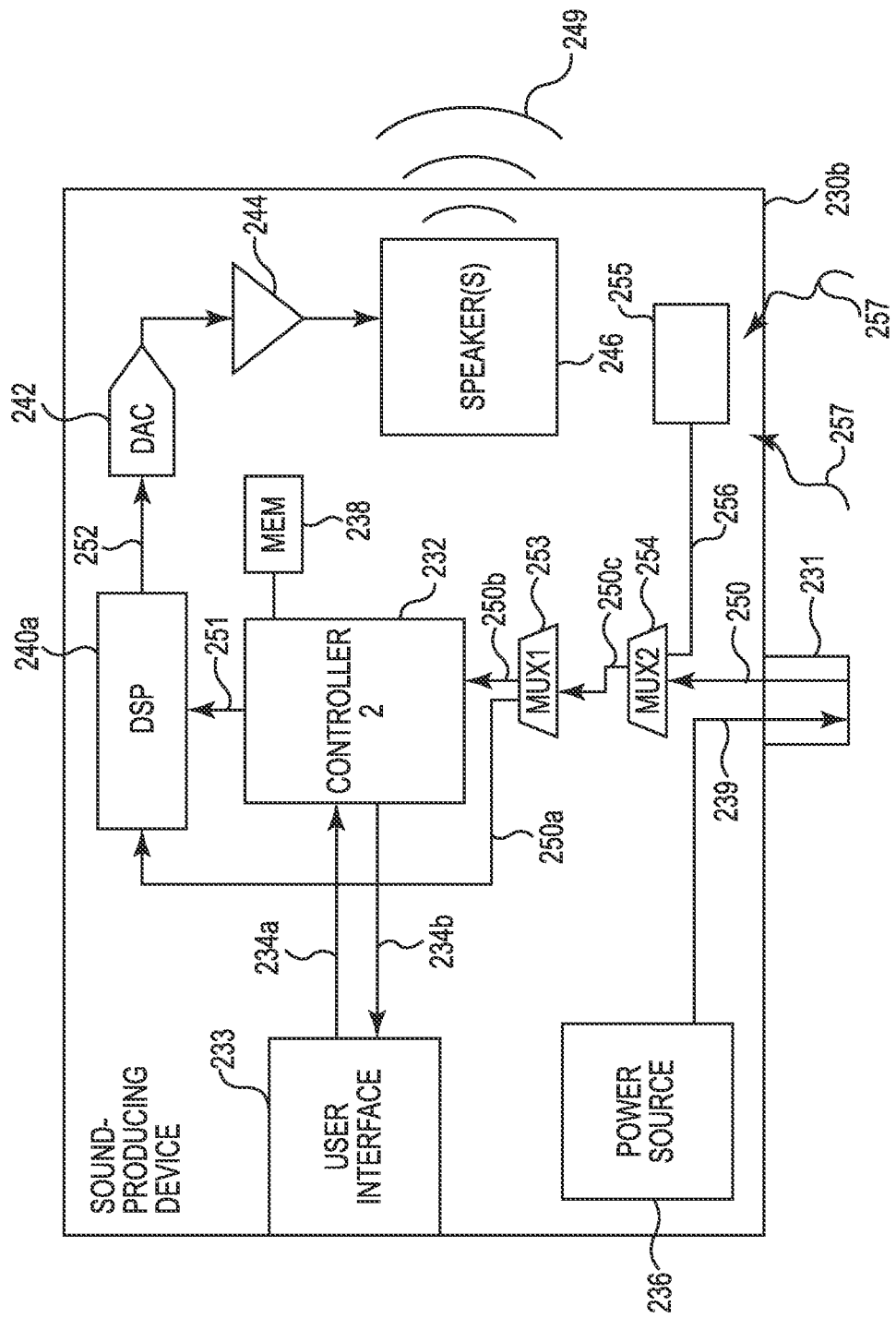

FIGS. 2A and 2B schematically depict alternative sound-producing devices to the one of FIG. 2. In these figures, like elements are designated with like reference numerals, and need no further explanation to avoid unnecessary repetition. The sound-producing device 230a of FIG. 2A, or the sound-producing device 230b of FIG. 2B, may be substituted for the sound-producing device 230 in the audio system 202 of FIG. 2.

The sound-producing device 230a may be the same as or similar to the device 230, except that the device 230a includes a switch 253 such as a first multiplexer (MUX1) interposed in the circuit between the electronic coupling member 231 and the digital controller 232. Furthermore, the digital signal processor (DSP) 240a provided in the device 230a may differ from the DSP 240 of device 230, insofar as the DSP 240a has two separate inputs or input channels associated with the same audio output on line 252. In an exemplary embodiment, one of these input channels is an analog input channel configured to receive analog signals, and the other input channel is a digital input channel configured to receive digital signals. The switch 253 can be configured so that in one switch state, the switch directs an incoming signal on line 250, such as an audio signal or a control signal, to an input of the digital controller 232 on a line 250b, while in another switch state, the switch directs the incoming signal to the DSP 240a on a line 250a, bypassing the digital controller 232.

The switch 253 may thus allow the sound-producing device 230a to accept on a given pair of conductive contacts within the electronic coupling member 231 (corresponding to line 250) different types of incoming signals, and to process them differently. For example, a digital audio signal provided to such conductive contacts may be directed by the switch 253 to a digital input of the controller 232 over the line 250b, the audio signal being digitally manipulated by the controller 232 and fed to a digital input of the DSP 240a over the line 251, and processed and subsequently fed to the speaker(s) 246 by the line 252 through the DAC 242 and amplifier 244. On the other hand, an analog audio signal provided on the very same conductive contacts of the electronic coupling member 231 may be directed by the switch 253 (in a second switch state) to an analog input of the DSP 240a over the line 250a, bypassing the digital controller 232, but again being fed to the speaker(s) 246 by the line 252 through the DAC 242 and amplifier 244. Still further, a digital control signal, such as those used for product initialization or setup during the manufacturing process, can be provided on the same conductive contacts of the electronic coupling member 231, and such control signal can be directed by the switch 253 to a digital input of the controller 232 along line 250b, and used to program or initialize the controller 232 and/or the DSP 240a. In the first switch state, the switch connects the switch input on line 250 to a first switch output on line 250b but not to a second switch output on line 250a, and in the second switch state, the switch connects the switch input to the second switch output on line 250a but not to the first switch output on line 250b.

The switch 253 may be controlled in any desired fashion, but preferably it is made to change from the first switch state to the second switch state, or vice versa, by a control signal provided by the digital controller 232 over one or more suitable control lines (not shown).

The sound-producing device 230b of FIG. 2B may be the same as or similar to the device 230a, except that the device 230b also includes a second switch 254 such as a second multiplexer (MUX2) interposed in the circuit between the electronic coupling member 231 and the first switch 253. Furthermore, the device 230b also includes a wireless transceiver 255 configured to receive radio frequency signals 257, which signals may comprise audio signals, control signals, or both audio signals and control signals. The transceiver 255 may for example be or include a Bluetooth transceiver, and the signals 257 may originate from a Bluetooth device external to but in the vicinity of the sound-producing device 230b.

The switch 254 has two input channels that alternately couple, e.g. by operation of a control signal from the digital controller 232, to an output channel, the output channel connected by line 250c to the input of the switch 253 as shown. In analogous fashion to switch 253, the switch 254 can be configured so that in one switch state, the switch directs an incoming signal on line 250 to the switch output on line 250c, while in another switch state, the switch instead directs an incoming signal on the line 256 (from the transceiver 255) to the switch output on line 250c.

The transceiver 255 in combination with the switch 254 thus provides the sound-producing device 230b with the added capability of receiving audio signals by the transceiver 255, in addition to the capability of receiving audio signals via the electronic coupling member 231, whether directly from the output of an audio source, or indirectly through any of the external interfaces described elsewhere herein.

Figure 3:
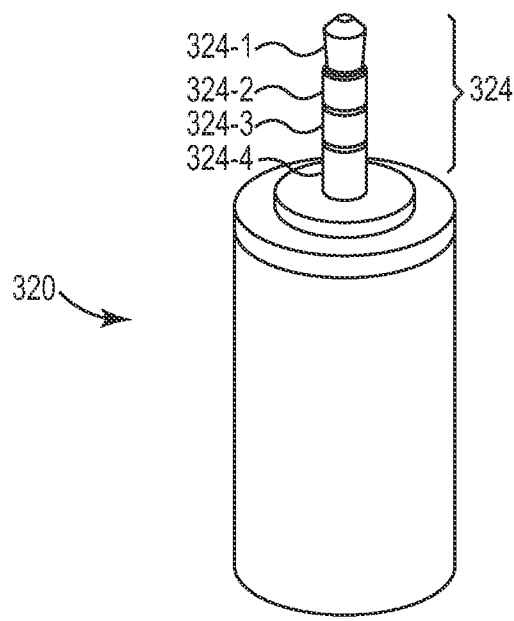
FIG. 3 is a perspective view of an external interface.

FIG. 3 is a perspective view of an external interface 320 which may be the same as or similar to other external interfaces discussed herein. The external interface 320 is desirably relatively small and portable relative to the sound-producing device it mates to. In some embodiments, the external interface 320 is 0.5 inches in diameter and 0.75 inches in length. Other sizes and dimensions may also be used.

The external interface 320 has an electronic coupling member 324 which is adapted to removably mate with a complementary electronic coupling member on the sound-producing device so that audio-encoded signals and electrical power can be transferred between those devices as discussed herein. The coupling member 324 may be the same as or similar to other electronic coupling members discussed herein. In that regard, the electronic coupling member 324 may have 4 separate electrical contacts, such as contacts 324-1, 324-2, 324-3, and 324-4. If desired, these contacts can be assigned functions that correspond, or substantially correspond, to the functions of the 4 contacts of a standard USB connector. That is, one of the contacts can be used for ground or negative potential. Another contact can be used for nominally 5 volt power (positive potential) relative to the ground contact. The remaining two contacts can be used for data transfer according to standard USB protocol. For example, data transferred over the two contacts may be digitally encoded as described elsewhere herein. The plug shown in FIG. 4 as the electronic coupling member 324 of the external interface 320 represents a conventional 4-conductor sub-miniature (2.5 mm diameter) electrical plug, but the reader will understand that other known or later-developed plugs or jacks can be used instead. In an exemplary embodiment, the positive potential power supplied to the external interface 320 by the sound-producing device is supplied by the center contact, 324-1.

Figure 4A:
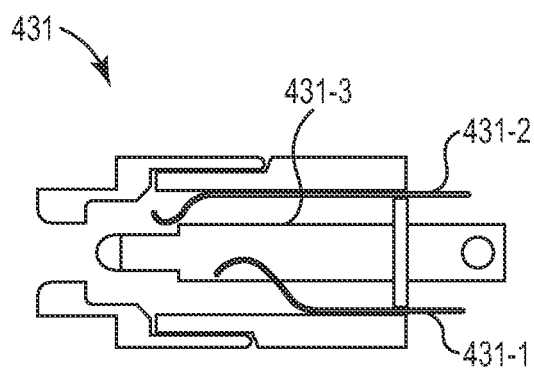
FIG. 4A is a schematic cross-sectional view of a female electronic coupling member suitable for mating to the male electronic coupling member seen in FIG. 3.
Figure 4B:
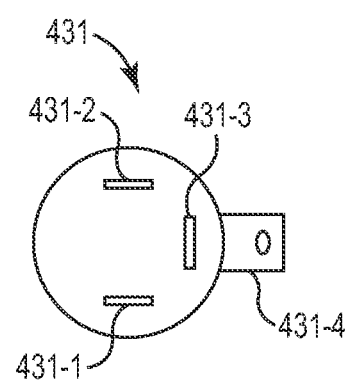
FIG. 4B is a schematic end view of the coupling member of FIG. 4A.

FIG. 4A is a schematic cross-sectional view of a female electronic coupling member suitable for mating to the male electronic coupling member 324 seen in FIG. 3. Four bent conductive strips, including the three strips 431-1, 431-2, and 431-3 shown in FIG. 4A, engage the different portions of the coupling member 324 to provide 4 isolated electrical paths between the coupling members 324, 431, and thus between the external interface and the sound-producing device. A portion of the fourth bent strip 431-4 can be seen in the end view of the electronic coupling member 431 shown in FIG. 4A.

Figure 5A:
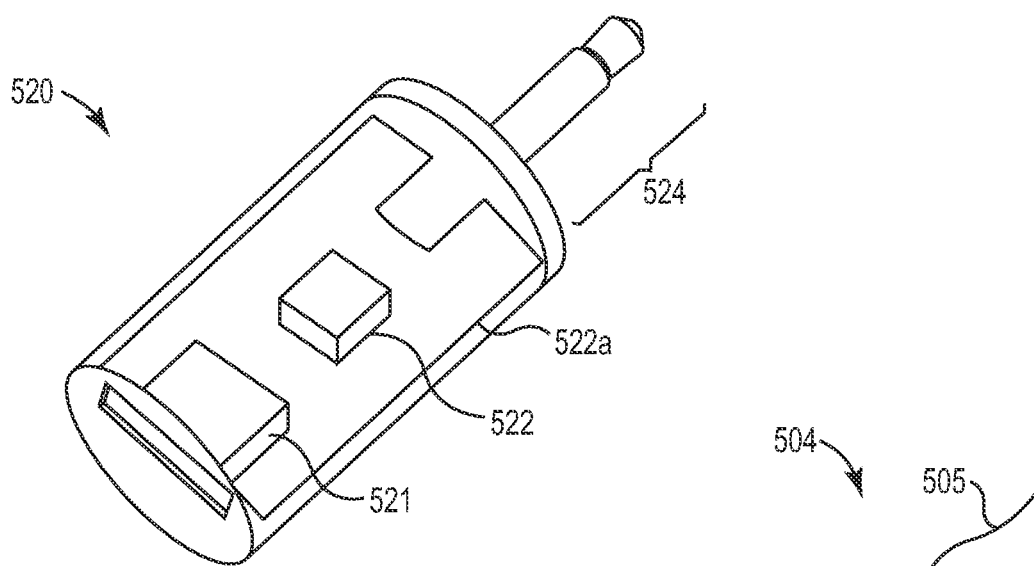
FIG. 5A is a schematic perspective view (with internal components shown in solid lines) of an external interface adapted for a wired connection to the audio source.
Figure 5B:
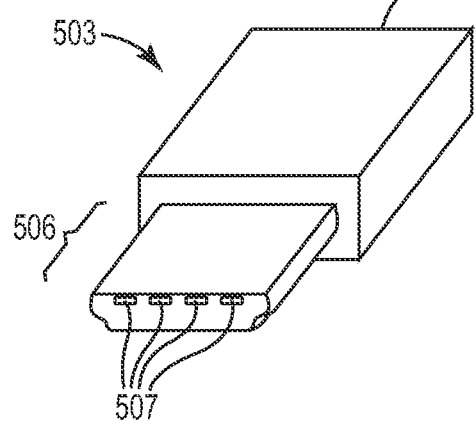
FIG. 5B is a schematic perspective view of a plug that may be used to provide a wired connection from an audio source to the external interface of FIG. 5A.

In FIG. 5A we see another external interface 520 which may be the same as or similar to other external interfaces discussed herein. The external interface 520 includes an electronic coupling member 524, which may be the same as or similar to other electronic coupling members discussed herein. The interface 520 also contains some electrical components that are internal to the main body of the interface. (Here and elsewhere in this document, the body or main body of the external interface refers to the entire external interface except for the electronic coupling member that connects the external interface to the sound-producing device.) For schematic purposes and ease of illustration, some of the internal components are shown in solid lines. In particular, the interface 520 includes a circuit board 522a on which is mounted various active electrical components, such as a controller 522. The controller 522 may be the same as or similar to the controller 122 discussed above, and may include signal conversion circuitry as discussed herein. The interface 520 also includes another electronic coupling member 521. Unlike the electronic coupling member 524, the coupling member 521 is for connecting the interface 520 to the audio source such as audio source 210 by a wired connection or cable. Such a cable is shown as cable 504 in FIG. 5B, with wires 505 and a connector 503 at one end thereof for connecting to the external interface 520. The connector 503 includes an electronic coupling member 506 in the form of a mini-USB style plug with four conductors 507, which may be adapted to removably mate with the electronic coupling member 521 of the interface 520.

The device 520 of FIG. 5A may be modified to represent a pass-through interface as discussed above. This may be done by removing at least the controller 522 and any other active electronics, and simply providing a wire or other conductive path from each conductor on the electronic coupling member 521 to a unique conductor on the electronic coupling member 524, or vice versa. Such a pass-through interface may for example provide USB-encoded signals (and power) from the audio source to the sound-producing device, but using an electrical plug (i.e., electronic coupling member 524) that is not typically associated with USB encoding. In such cases, if the digital controller in the sound-producing device is configured to process digital USB-encoded audio signals, the digital controller may be designed to detect the incoming USB signal and configure itself (the digital controller in the sound-producing device) as a USB device rather than a USB host. (In this mode of operation, the electrical USB power provided to the sound-producing device via the pass-through unit can be used to charge the battery in the sound-producing device, if present.) In contrast, when the sound-producing device is coupled to an external interface having signal conversion circuitry and other active electronic components as described herein, the digital controller in the sound-producing device can respond by reconfiguring itself as a USB host, in which it (among other things) provides power from its internal power source to the external interface.

In other embodiments, the external interface may be designed to receive an incoming audio signal by a wired connection, and the signal conversion circuitry may convert such signal to an outgoing audio signal by active circuitry that simply amplifies or attenuates the outgoing signal relative to the incoming signal. The external interface may also serve as an impedance matching device, e.g. by providing a given load impedance that is suitable for the audio source, and providing a substantially different source impedance to the sound-producing device. Thus, for example, the controller 522 of FIG. 5A may in such cases be or comprise an amplifier or attenuator circuit, an impedance matching circuit, or both, and such circuitry may be powered by the power source in the sound-producing device.

Figure 6:
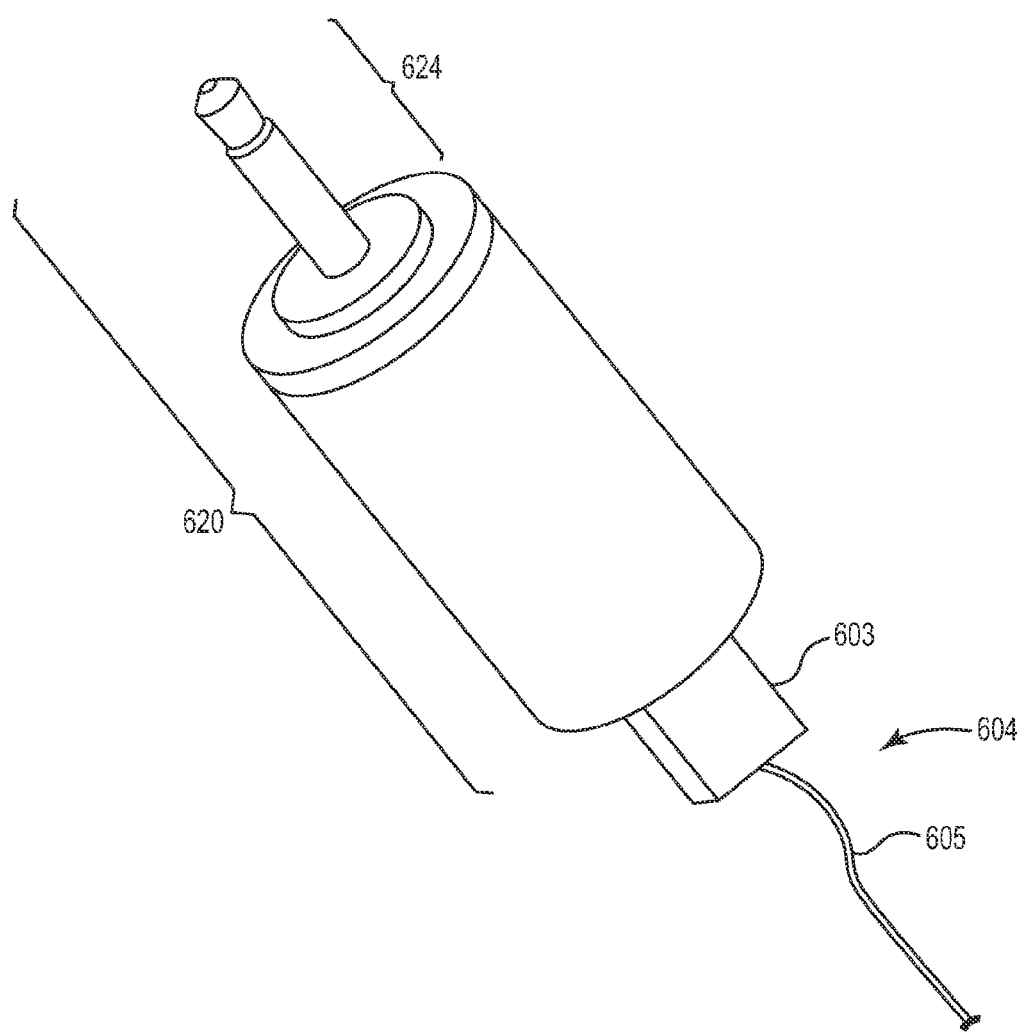
FIG. 6 is a schematic perspective view of an external interface connected to a connectorized cable to provide a wired connection to an audio source.

In FIG. 6, we see an external interface 620 connected by a cable 604 (which includes wires 605 and a connector 603) to an audio source (not shown). The external interface 620, its electronic coupling member 624, and the cable 604 may be the same as or similar to interface 520, coupling member 524, and cable 504, respectively, discussed above.

Figure 7:
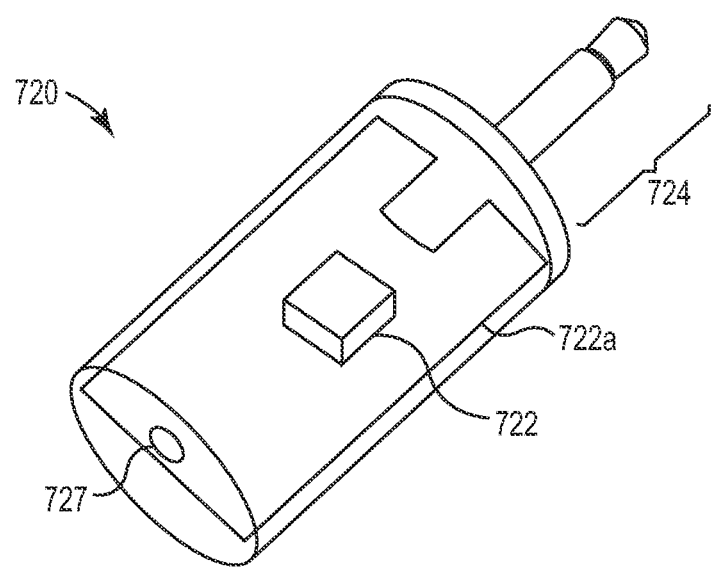
FIG. 7 is a schematic perspective view (with internal components shown in solid lines) of an external interface adapted for a wireless connection to the audio source.

In FIG. 7, we see an external interface 720 that is adapted for a wireless connection to the audio source. The interface 720 includes an electronic coupling member 724 for removable mating with a corresponding coupling member of the sound-producing device. The interface 720 also includes a circuit board 722a on which is mounted various active electrical components, such as a controller 722. The controller 722 may be the same as or similar to the controller 122 discussed above, and may include signal conversion circuitry as discussed herein. The interface 720 also includes an antenna (not shown) for receiving the wireless audio-encoded signal from the audio source, and a push button 727. The push button 727 is pressed by the user during the setup process to establish a communication link from the audio source to the interface 720.

Figure 8:
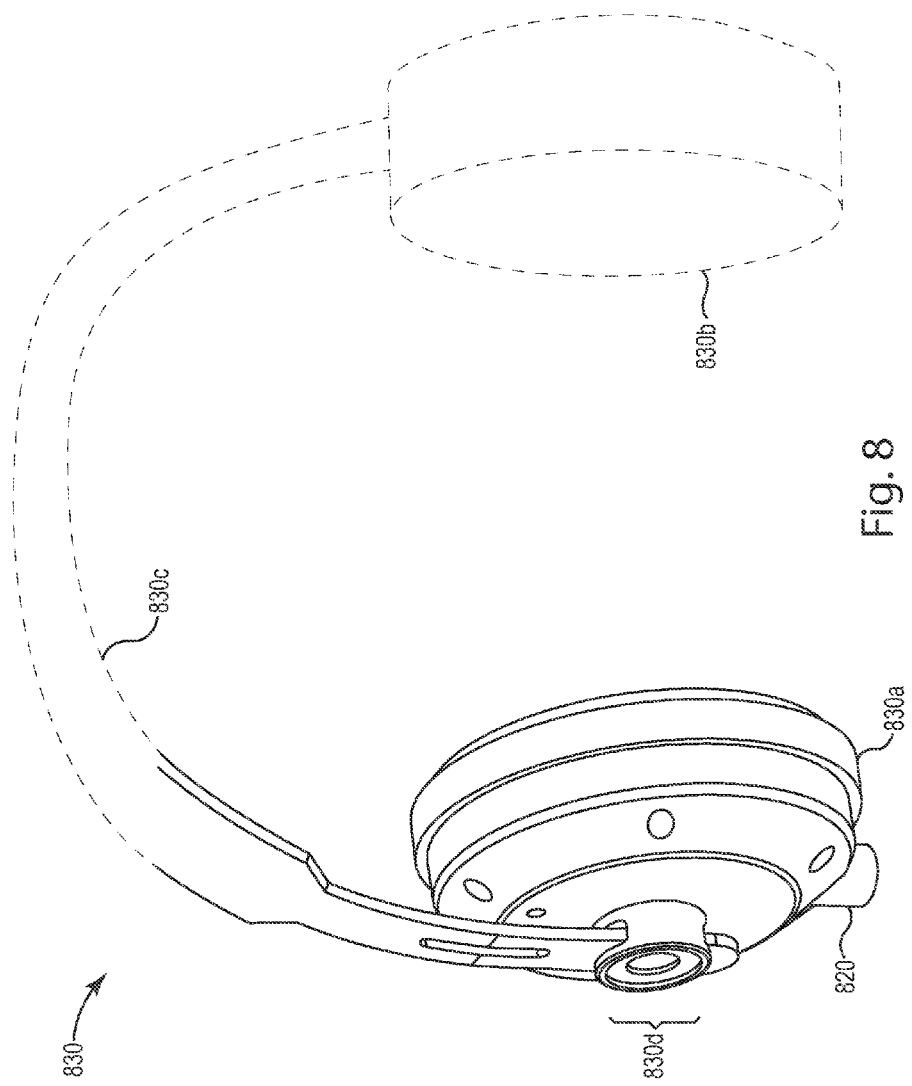
FIG. 8 is a schematic perspective view of a sound-producing device in the form of headphones, in combination with an external interface removably connected thereto.

FIG. 8 shows a sound-producing device 830 in the form of headphones, in combination with an external interface 820 removably mated thereto. The device 830 and interface 820 can be the same as or similar to corresponding devices and interfaces respectively discussed elsewhere herein. The device has an earpiece 830a, e.g. a right-channel earpiece, and an earpiece 830b, e.g. a left-channel earpiece, connected by a band 830c. The external interface 820 plugs into the earpiece 830a. Wires (not shown) in the band 830c connect an audio transducer and/or other circuit components in one earpiece with remaining circuit components in the other earpiece. For example, a digital controller and other signal processing components can be housed on a circuit board (along with at least one audio transducer) in the earpiece 830a, and a power source, in the form of a rechargeable battery, can be housed (along with another audio transducer) in the earpiece 830b. The earpiece 830a includes a central hub feature 830d at or near which the band 830c connects to the earpiece. A user interface, such as the user interface 233 described above, may be attached to the device 830 at this central hub feature 830d and electrically connect to circuit components inside the earpiece 830a.

Figure 9:
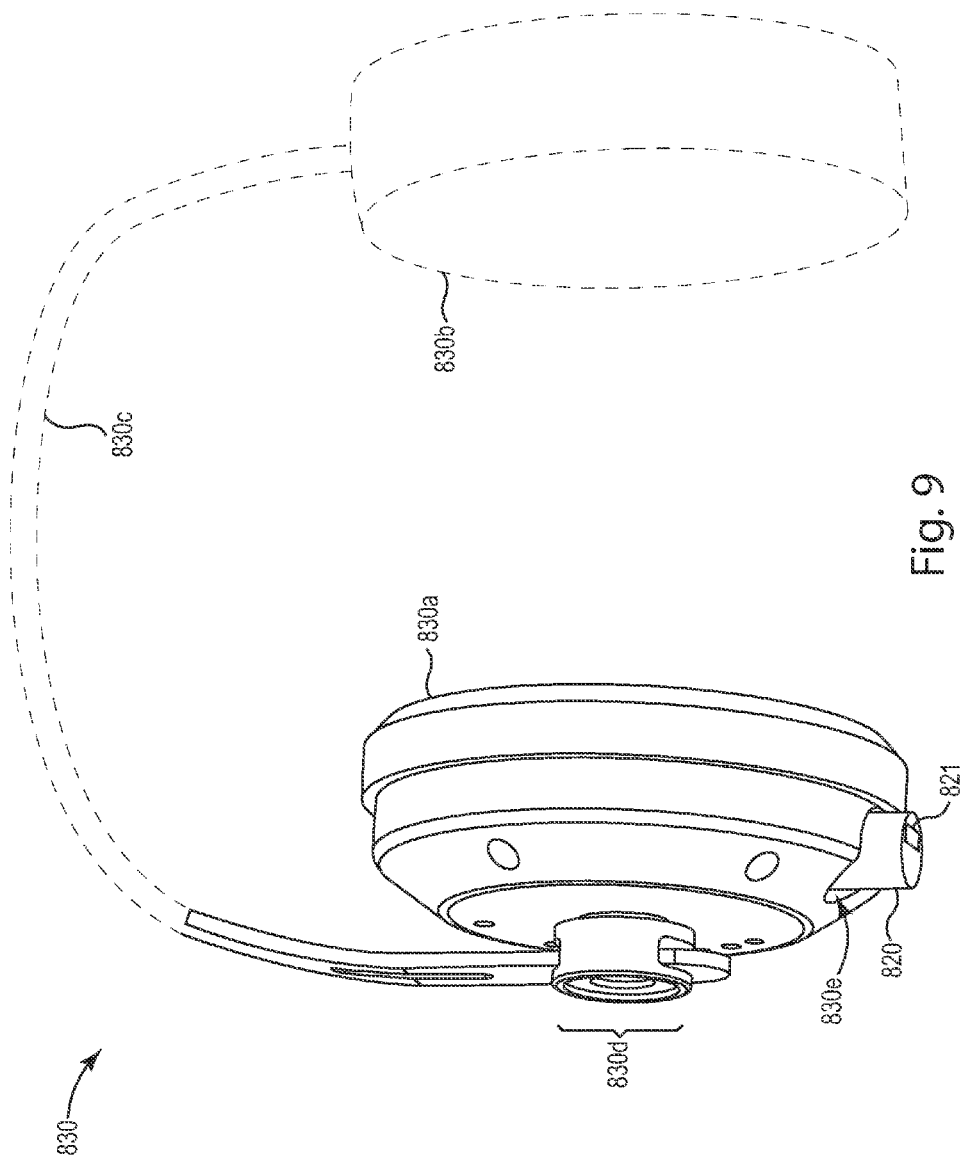
FIG. 9 is another schematic perspective view of the sound-producing device of FIG. 8, this view showing more clearly the how the exterior surface of the sound-producing device is provided with a recessed cavity to receive the external interface.

FIG. 9 is simply another view of the sound-producing device 830 of FIG. 8. The view of FIG. 9 shows more clearly the how the exterior surface of the sound-producing device 830 is provided with a recessed cavity 830e to receive the external interface 820. The interface 820 can also be seen to have an electronic coupling member 821 for attachment to an audio source by a wired connection.

Figure 10:
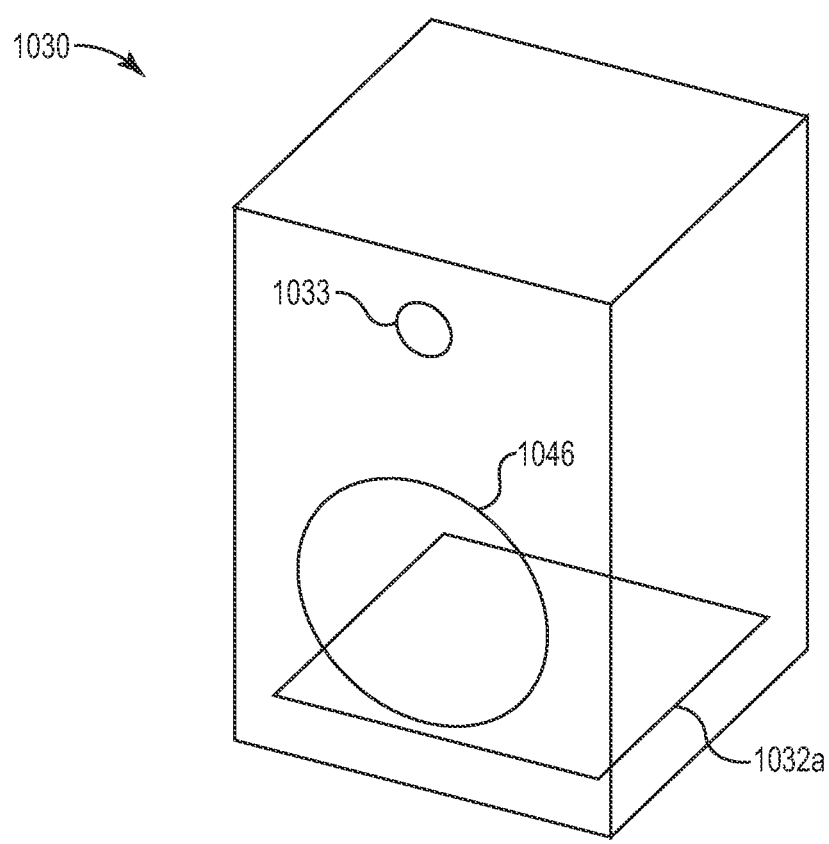
FIG. 10 is a schematic perspective view (with internal components shown in solid lines) of a sound-producing device in the form of a loudspeaker unit.

FIG. 10 shows a sound-producing device 1030 in the form of a loudspeaker unit. The device 1030 includes a circuit board 1032a on which is mounted a digital controller and other electronic components, as described elsewhere herein for other sound-producing devices. In the depicted embodiment, the device 1030 has a cabinet or housing on which, and within which, is mounted only one audio transducer (speaker) 1046. A region above the transducer 1046 can be used to provide a user interface 1033, such as the user interface 233 described above. Not shown in the figure, but provided for example on a back panel of the device 1030, is an electronic coupling device adapted to removably receive an external interface as described herein.

Figure 11:
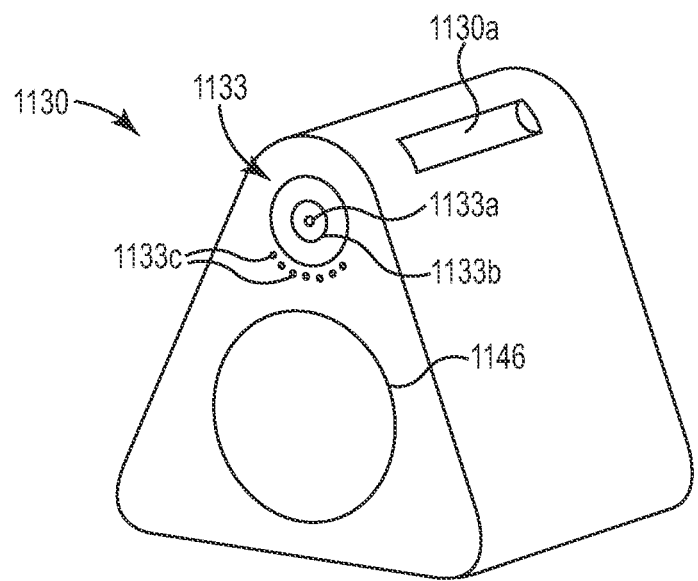
FIGS. 11, 12, and 13 are schematic perspective views of alternative loudspeaker units.
Figure 12:
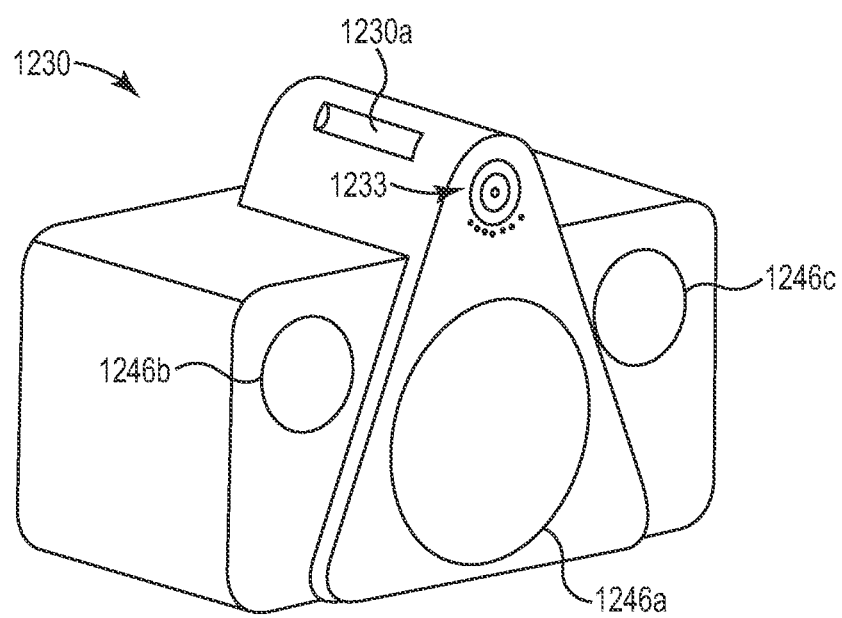
Figure 13:
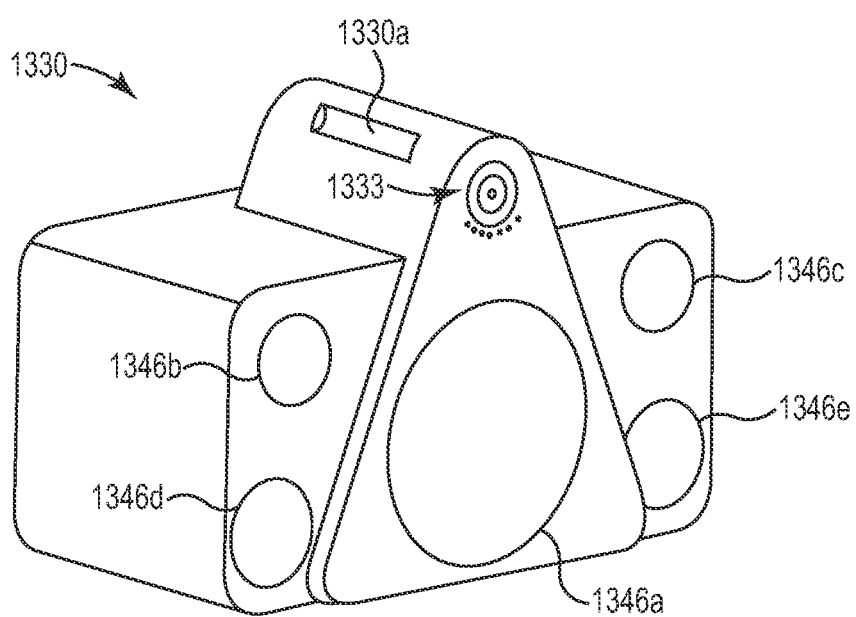

FIGS. 11 through 13 show other loudspeaker-like sound-producing devices, these devices having unique and aesthetic designs. In FIG. 11, a sound-producing device 1130 includes a cabinet on which is mounted only one audio transducer (speaker) 1146. Inside the cabinet (not shown) is one or more circuit boards on which are mounted a digital controller and other electronic components as described herein for other sound-producing devices. A region above the transducer 1146 is used to provide a user interface 1133, which may be similar to or the same as the user interface 233 above. The user interface 1133 may include one or more of: an on/off button 1133a, a volume knob or dial 1133b, and one or more visual indicators 1133c such as LEDs. In the embodiment shown, seven such indicators or LEDs are provided in a uniformly spaced pattern that forms an arc near the periphery of the knob 1133b, but more or less than seven indicators can be used. The cabinet is also provided with a recess 1130a that can be used for lifting or transporting the device 1130, e.g. sized to fit the user's hand or fingers. The exterior of the device 1130 may have a substantial mirror symmetry about a vertical plane, wherein another recess similar to recess 1130a is provided on the side of the cabinet that is hidden from view in FIG. 11. Not shown in the figure, but provided for example on a back panel of the device 1130, is an electronic coupling device adapted to removably receive an external interface as described herein. An electronic adapter, transformer, or the like that connects to electrical line power such as through a wall outlet or plug can also be provided on the back panel of the device 1130.

In FIG. 12, a sound-producing device 1230 includes a cabinet on which is mounted three audio transducers (speakers) 1246a. 1246b, 1246c. Inside the cabinet (not shown) is one or more circuit boards on which are mounted a digital controller and other electronic components as described herein for other sound-producing devices. A region above the transducer 1246a is used to provide a user interface 1233, which may be similar to or the same as the user interface 1133 above. The user interface 1233 may include one or more of: an on/off button, a volume knob or dial, and one or more visual indicators such as LEDs. The cabinet is also provided with a recess 1230a that can be used for lifting or transporting the device 1230, similar to previously described recess 1130a. The exterior of the device 1230 may have a substantial mirror symmetry about a vertical plane, wherein another recess similar to recess 1230a is provided on a side of the cabinet that is hidden from view in FIG. 12. Not shown in the figure, but provided for example on a back panel of the device 1230, is an electronic coupling device adapted to removably receive an external interface as described herein. An electronic adapter, transformer, or the like that connects to electrical line power such as through a wall outlet or plug can also be provided on the back panel of the device 1230.

In FIG. 13, a sound-producing device 1330 includes a cabinet on which is mounted five audio transducers (speakers) 1346a, 1346b, 1346c, 1346d, and 1346e. Inside the cabinet (not shown) is one or more circuit boards on which are mounted a digital controller and other electronic components as described herein for other sound-producing devices. A region above the transducer 1346a is used to provide a user interface 1333, which may be similar to or the same as the user interface 1233 above. The user interface 1333 may include one or more of: an on/off button, a volume knob or dial, and one or more visual indicators such as LEDs. The cabinet is also provided with a recess 1330a that can be used for lifting or transporting the device 1330, similar to previously described recess 1130a. The exterior of the device 1330 may have a substantial mirror symmetry about a vertical plane, wherein another recess similar to recess 1330a is provided on a side of the cabinet that is hidden from view in FIG. 13. Not shown in the figure, but provided for example on a back panel of the device 1330, is an electronic coupling device adapted to removably receive an external interface as described herein. An electronic adapter, transformer, or the like that connects to electrical line power such as through a wall outlet or plug can also be provided on the back panel of the device 1330.

In FIGS. 14A-14C, portions of a sound-producing device are shown to exemplify a few ways in which an external interface as disclosed herein may be physically (and removably) connected to an exterior or exterior-accessible surface of a sound-producing device.

In FIG. 14A, a portion of a sound-producing device 1430a is seen to have an electronic coupling member 1431a and an exterior surface 1460a. An external interface 1420 has an electronic coupling member 1424 configured to removably mate with the member 1431a. The exterior surface 1460a is substantially flat in the vicinity of the coupling member 1431a. The sound-producing device 1430a may be the same as or similar to other sound-producing devices described herein, and the external interface 1420 may be the same as or similar to other external interfaces described herein.

In FIG. 14B, a portion of a sound-producing device 1430b is seen to have an electronic coupling member 1431b and an exterior surface 1460b. An external interface 1420 has an electronic coupling member 1424 configured to removably mate with the member 1431b. The exterior surface 1460b is depressed to form a cavity 1462b in the vicinity of the coupling member 1431b. The cavity has a depth which is a fraction greater than zero and less than one (e.g., in a range from 10-90%, or 20-80%, or 30-70%) of the height of the main body of the interface 1420, such that a portion of the main body of the interface 1420 is within the cavity 1462b and the remaining portion of the main body of the interface 1420 is outside the cavity 1462b. Such an arrangement partially protects the interface 1420 from being inadvertently bumped or damaged, while also exposing enough of the interface 1420 so that a user can easily grasp it when pulling it out. The sound-producing device 1430b may be the same as or similar to other sound-producing devices described herein, and the external interface 1420 may be the same as or similar to other external interfaces described herein.

In FIG. 14C, a portion of a sound-producing device 1430c is seen to have an electronic coupling member 1431c and an exterior surface 1460c. An external interface 1420 has an electronic coupling member 1424 configured to removably mate with the member 1431c. The exterior surface 1460c is depressed to form a cavity 1462c in the vicinity of the coupling member 1431c. Also, an optional door or cover 1464c is provided to cover the cavity 1462c while also allow access thereto. The cavity 1462c has a depth which is a greater than a lateral dimension of the main body of the interface 1420, such that the interface 1420 can be contained fully within the cavity 1462c when connected to the member 1431c. This arrangement provides even more protection to the interface 1420 from being inadvertently bumped or damaged, while also allowing the user to access it by opening the cover 1464c (if present) and reaching into the cavity to grasp the interface 1420 when pulling the interface 1420 out. The sound-producing device 1430c may be the same as or similar to other sound-producing devices described herein, and the external interface 1420 may be the same as or similar to other external interfaces described herein.

Figure 17:
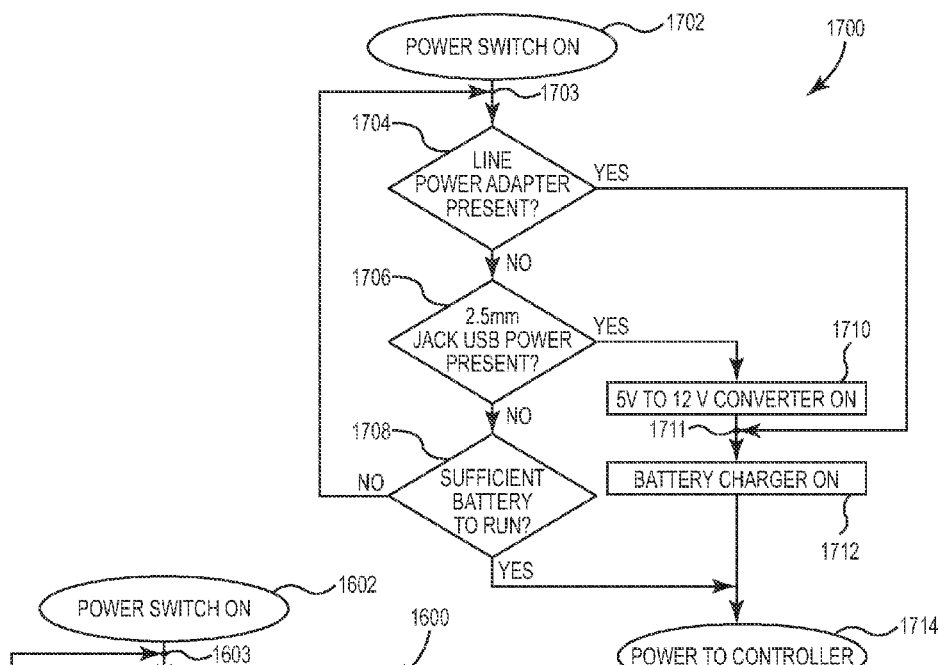
FIG. 17 is a flow diagram for a power supply circuit in a sound-producing device in which the power source includes both line power and a rechargeable battery.
Figure 16:
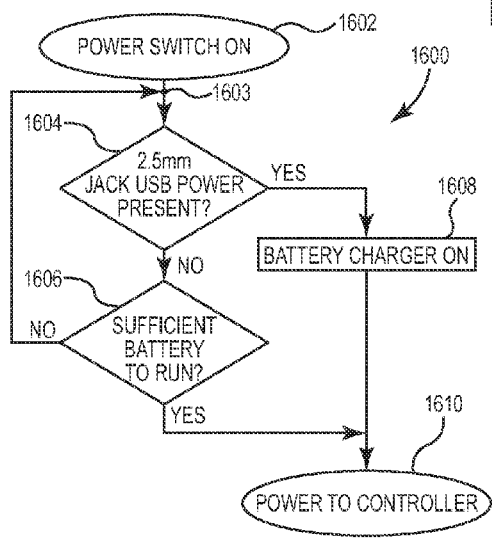
FIG. 16 is a flow diagram for a power supply circuit in a sound-producing device in which the power source includes a rechargeable battery.
Figure 15:
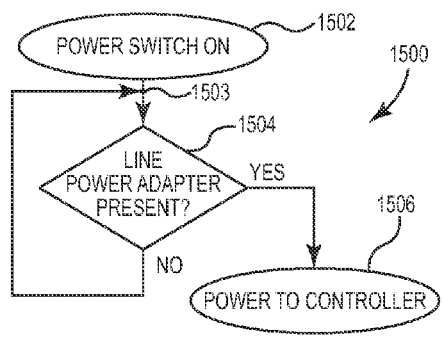
FIG. 15 is a flow diagram for a power supply circuit in a sound-producing device in which the power source includes line power.
Figure 18:
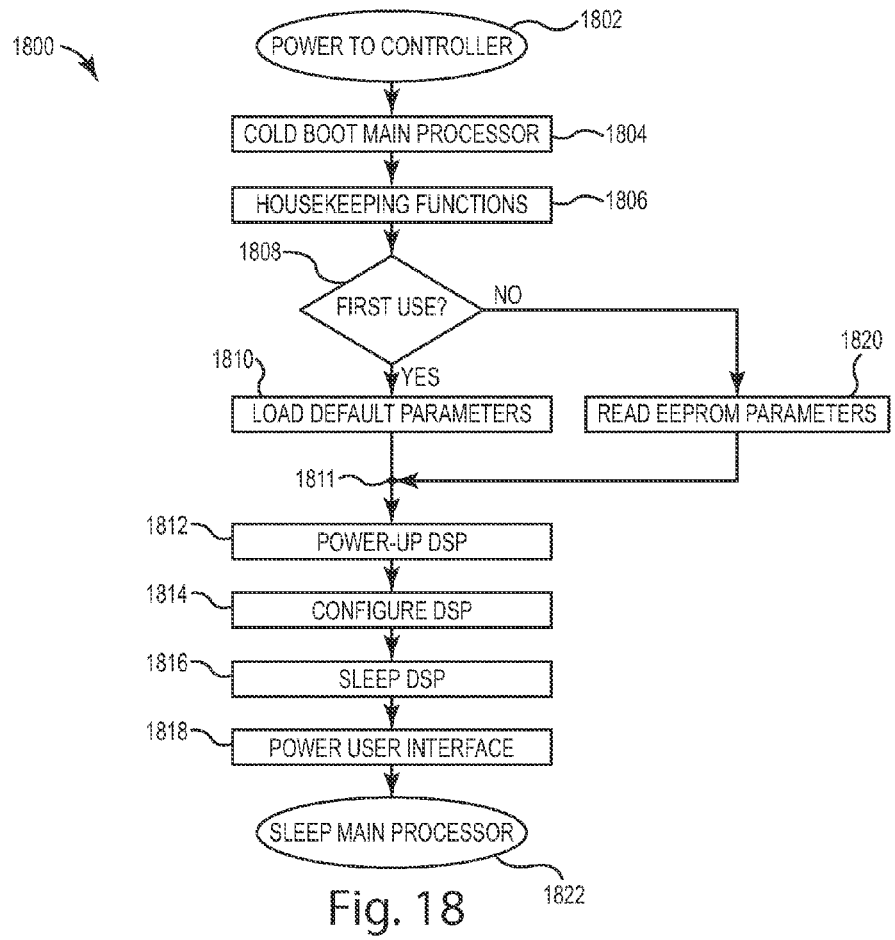
FIG. 18 is a flow diagram of power-up sequence for a digital controller in a sound-producing device.
Figure 19:
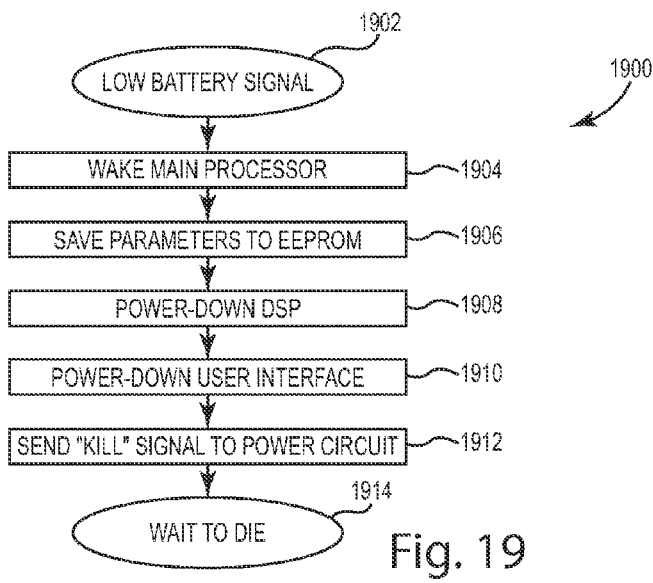
FIG. 19 is a flow diagram of a power-down sequence for a digital controller in a sound-producing device.
Figure 20:
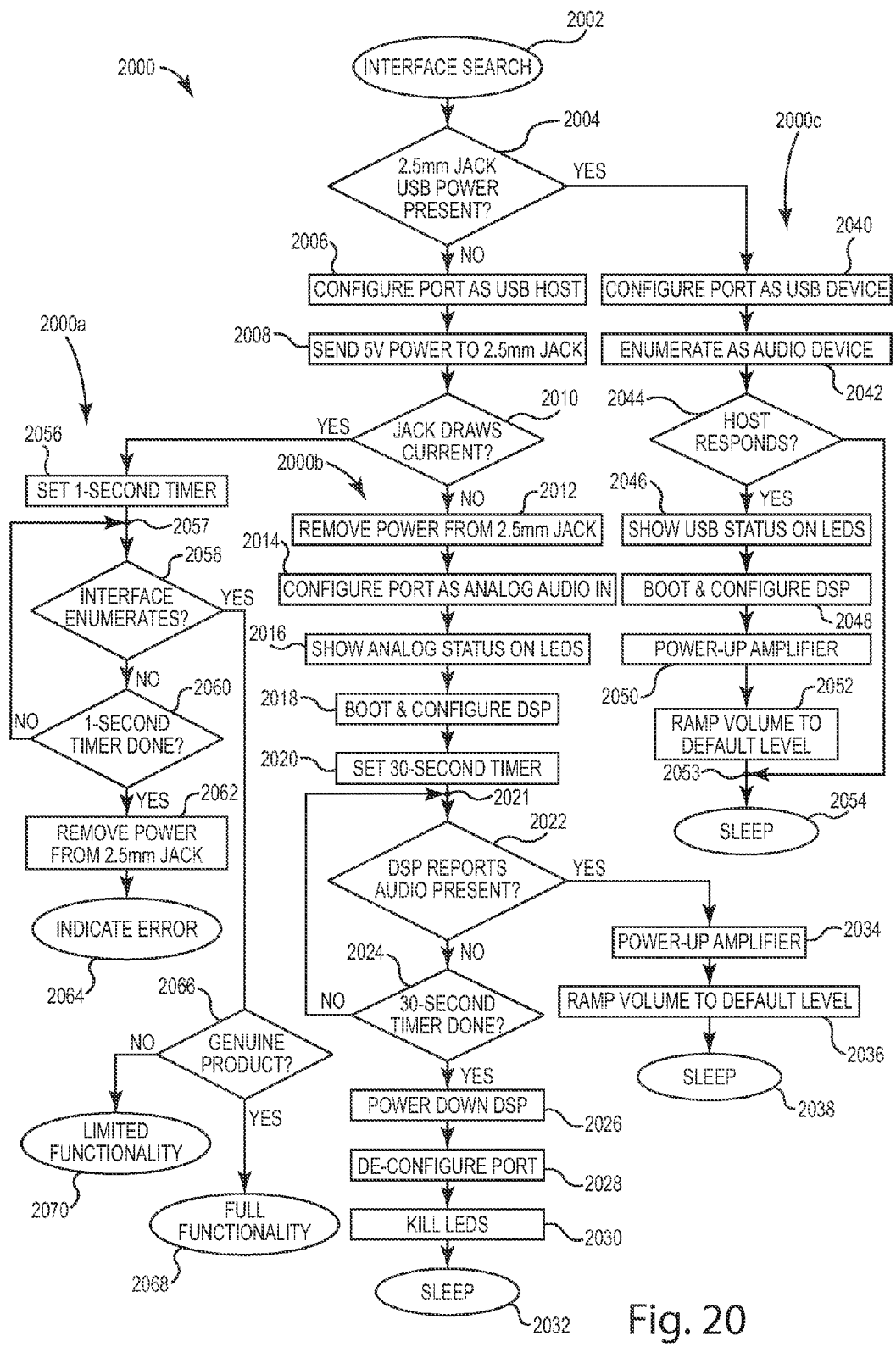
FIG. 20 is a flow diagram for a digital controller in a sound-producing device, the digital controller configured to select one of three different operating configurations depending on the signal provided by the external interface.
Figure 21:
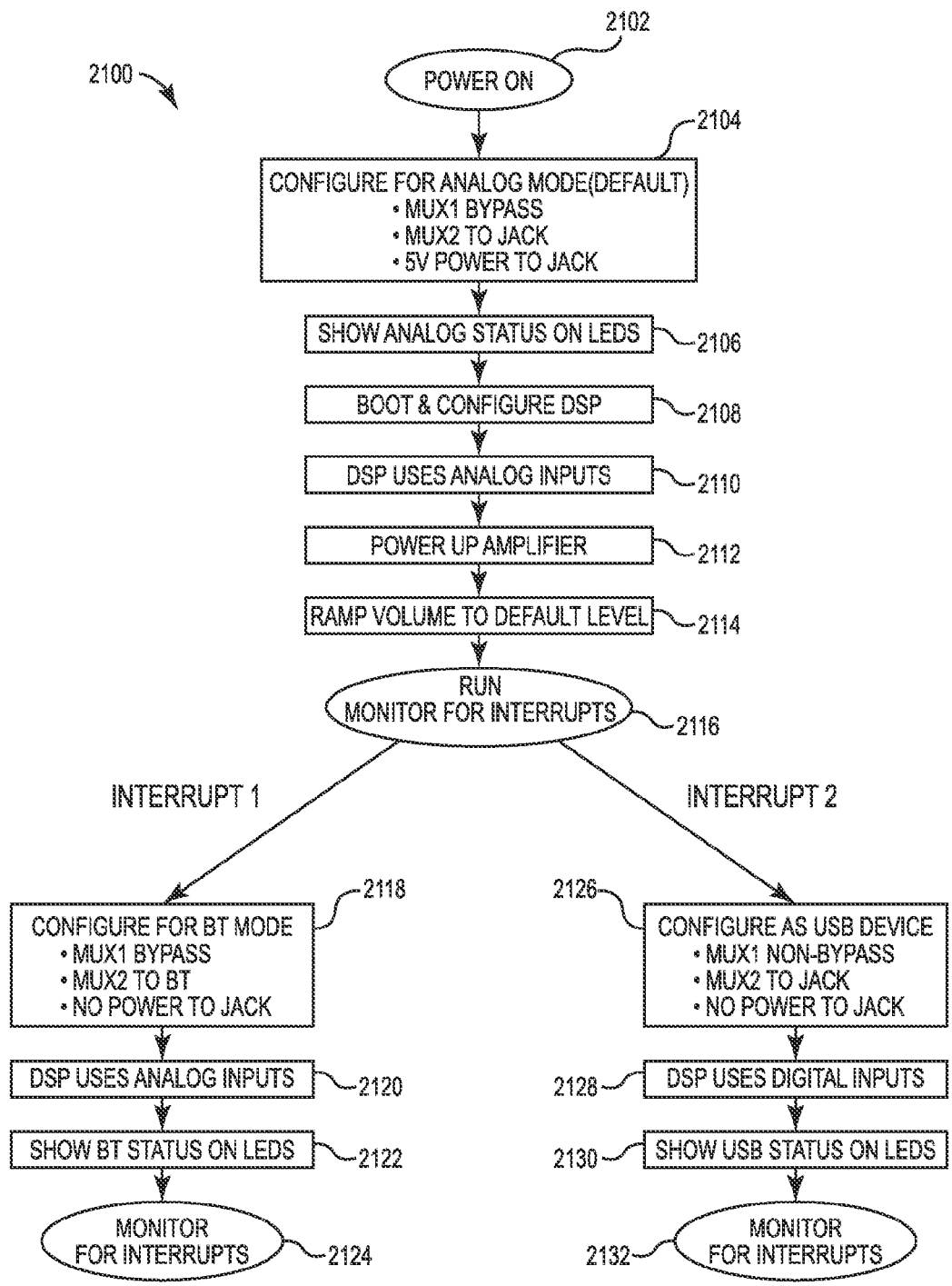
FIG. 21 is a flow diagram showing the high-level operation of another sound-producing device.

FIGS. 15 through 21 provide flow diagrams that relate to various aspects of some embodiments of the disclosed audio systems. FIGS. 15-17 relate to the operation of semi-autonomous power circuitry that can be used as part of the power source of the sound-producing device. FIG. 18 relates to a startup operation of the digital controller in the sound-producing device. FIG. 19 relates to a powering down of the digital controller in the sound-producing device. FIG. 20 relates to a configuration selection operation of the digital controller a sound-producing device. FIG. 21 relates to the operation of a sound-producing device such as that of FIG. 2B.

The flow chart 1500 of FIG. 15 assumes the power source includes a line power adapter (e.g. a wall plug) but no battery. At starting point 1502, the user turns on the power switch, such as the on/off button 1133a described above. Operation then proceeds to box 1504. If electrical power is present on the line power adapter, operation proceeds further to point 1506, at which electrical power is provided to the digital controller. If electrical power is not present on the line power adapter at box 1504, operation returns to point 1503.

The flow chart 1600 of FIG. 16 assumes a 2.5 mm jack is used as the electronic coupling member (see e.g. coupling member 131 above) on the sound-producing device, and further that the jack can receive another electronic coupling member, such as that of a pass-through interface, that provides USB power (e.g. 5 volts) on one of the conductor lines. FIG. 16 also assumes the power source includes a rechargeable battery, and an associated battery charger capable of charging the battery from the USB power. At the starting point 1602, the user turns on the power switch, such as the on/off button 1133a described above. Operation then proceeds to box 1604. If USB power is present at the 2.5 mm jack, then operation proceeds to box 1608, at which the battery charger is turned on. Operation then proceeds further to point 1610, at which electrical power is provided to the digital controller. If USB power is not present at box 1604, operation proceeds to box 1606. There, the power circuitry checks to see if the battery is sufficiently charged to run the circuitry in the sound-producing device. If yes, operation proceeds to the point 1610, but if not, operation returns to point 1603.

The flow chart 1700 of FIG. 17 makes the same assumptions as the flow chart of FIG. 16, but with the additional assumptions that (1) the operating voltage level of the rechargeable battery is 12 volts rather than 5 volts or less, and (2) the power source includes not only the rechargeable battery but also a line power adapter. At the starting point 1702, the user turns on the power switch, such as the on/off button 1133a described above. Operation then proceeds to box 1704. If electrical power is present on the line power adapter, operation proceeds to a point 1711, and from there to box 1712, at which the battery charger is turned on and the line power (e.g. 110 volts) is used to charge the battery. From there, operation proceeds to point 1714, at which electrical power is provided to the digital controller. If electrical power is not present on the line power adapter (box 1704), operation proceeds to box 1706. If USB power is present at the 2.5 mm jack, operation proceeds to box 1710, at which a step-up converter (e.g. 5 volts USB power to 12 volts) is turned on, and from there operation proceeds to box 1712 as described earlier. If USB power is not present at the 2.5 mm jack (box 1706), operation proceeds to box 1708. There, the power circuitry checks to see if the battery is sufficiently charged to run the circuitry in the sound-producing device. If yes, operation proceeds to the point 1714, but if not, operation returns to point 1703.

The semi-autonomous power circuitry associated with FIGS. 15-17 can operate without intervention from any processor, but provides status information to the main microprocessor in the sound-producing device. In battery-operated units, the main processor can send a "kill" signal to instruct the power circuit to turn off its own power. Components of the power circuitry may include a rechargeable battery, a step-up converter to allow a 12 volt battery to be charged from the nominal 5 volt power supplied by the USB host, a line-operated power supply, a battery charger IC, and a battery monitor/fuel gauge IC. The units may include a "soft off" control feature that puts the sound-producing device into a low-power "sleep" mode to allow a fast wake-up to full functionality. The units may also include a master on/off button such as button 1133a to completely disconnect power for long-termn storage.

After the autonomous power circuitry has determined there is adequate electrical power, the power circuitry proceeds by sending power to the logic circuit. The first part of the logic circuit that is ready to accept that power is the main processor, which controls power to the other main parts of the circuit, such as the user interface, the DSP, and the amplifier. The main processor uses (1) conventional Flash memory for its own program instructions, (2) RAM memory for data, and (3) EEPROM for settings that should be carried over from one use to the next of the sound-producing device, since EEPROM retains stored information in the absence of power. Carry-over settings suitable for EEPROM may include settings such as which type of interface (see e.g. FIG. 20 below), what audio source it is associated with, what channel (in a multi-channel configuration such as left, right, front, rear, etc.) it is assigned to, and the last volume control setting. On the user's very first use of the sound-producing device, the EEPROM is empty, so default parameters are loaded instead. Startup operation of the circuit may proceed as shown in the flow chart 1800 of FIG. 18.

At starting point 1802, electrical power is provided to the controller, e.g. as shown at the bottom of each of FIGS. 15-17. From there, operation proceeds to box 1804, where the main processor is powered up ("booted" up) with a cold boot, followed by box 1806, where housekeeping functions are taken care of. Thereafter, operation proceeds to box 1808. There, if this is the first use of the unit, operation proceeds to box 1810, where default parameters are loaded from memory, then to box 1812, where the DSP is powered up, then to box 1814, where the DSP is configured, then to box 1816, where the DSP is put to sleep, followed by box 1818, where the user interface is powered, and followed by point 1822, where the main processor is put to sleep. If this is not the first use of the unit (box 1808), then operation proceeds to box 1820, where the parameter settings stored in EEPROM are read, after which operation proceeds to point 1811 and thereafter to boxes 1812 to 1822 as already described.

The main processor firmware in the sound-producing device may be interrupt driven. In such cases, the main processor will spend most of its time in a low-power "sleep" mode, waking only when an external stimulus tells it there is something to do. The external stimulus can originate from any of a number of possible components, such as the autonomous power circuit (e.g. when external power is connected or disconnected, or when the battery charge falls below a specified level, etc.), or the user interface (e.g. when a button has been pressed or released, or when the volume knob is turned), or the 2.5 mm jack (e.g. when USB power input is applied or removed, or when audio data or other data is received). Operation on wake-up will depend on the source and nature of the interrupt. The flow chart 1900 of FIG. 19 relates to a wakeup due to low battery detection by the autonomous power circuit.

At the starting point 1902, the autonomous power circuit provides the low battery indication. From there, operation proceeds to box 1904, where the main processor wakes up. Next, at box 1906, the parameter settings currently in use are saved to the EEPROM, after which the DSP is powered down (box 1908), the user interface is powered down (box 1910), a "kill" signal is sent to the power circuit (box 1912), and the unit waits to completely shut down at point 1914.

Turning now to FIG. 20, we first provide some background for this flowchart. We assume that the sound-producing device can communicate with an audio source via a variety of plug-in external interfaces (e.g. external interface 220 of FIG. 2) and pass-through interfaces (which have no signal conversion circuitry or other active circuitry). All such interfaces may couple to the same 2.5 mm 4-conductor plug-in jack to communicate with the sound-producing device. The interfaces may include interfaces for analog audio (using a pass-through interface), USB (using a pass-through interface), Bluetooth (using an external interface (not pass-through)), and Wi-Fi (using an external interface), as well as other formats discussed herein.

The flow chart 2000 of FIG. 20 sets forth a procedure by which the digital controller of the sound-producing device goes through a configuration selection procedure to determine how to configure itself among several options. The flowchart 2000 has three main branches. In a first branch 2000a, the controller configures itself as a USB host and communicates, or attempts to communicate, with the external interface or other device it is connected to. In a second branch 2000b, the controller configures itself to play (process) analog audio signals. In a third branch 2000c, the controller configures itself as a USB device and attempts to treat the device it is attached to (e.g. an audio source 210) as a USB host.

Any given USB host (including e.g. computers or smartphones) provides 5 volt power to a USB device that attaches to it. The pass-through interfaces described above, if connected to a USB port of an audio source, simply provide a direct feed-through of the USB signals and power to from the audio source to the sound-producing device. Therefore, after entering the interface search (point 2002), we go to box 2004 to detect whether USB power is present on the 2.5 mm jack.

If such power is present, we initially assume the unit (i.e., the sound-producing device) has a wired connection to a USB host. Consequently, in this case, operation proceeds to box 2040, where we configure the unit as a USB device. However, the USB power may be present because the user plugged the unit into a USB power supply (e.g. connected to a wall plug), rather than into a full-functioned USB device. To determine this, we proceed to box 2042, where the unit enumerates as an audio device. Enumeration is a USB protocol in which a USB device identifies itself to a USB host, so that the USB host knows which drivers to use. By determining if the other device has responded to our enumeration (box 2044), we can determine if the other device is a USB-configured audio source or not. If the other device responds, we assume the other device is a USB-configured audio source, thus we: show the USB status on the user interface LEDs (box 2046), boot and configure the DSP (box 2048), power up the amplifier (box 2050), ramp the volume to the default level (2052), and then sleep (point 2054). On the other hand, in reference to box 2044, if there is no response to our enumeration, we assume the other device is simply a USB wall charger, which provides no audio signals, hence powering of the amplifier and DSP is avoided, and operation proceeds to point 2053, and from there to point 2054.

We return then to box 2004, and consider the case where no USB power is detected at the jack. In this case, the other device may be an external interface such as interface 220 of FIG. 2, which requires power from the sound-producing device to operate. To determine if this is the case, operation proceeds to box 2006, where we configure the port (unit) as a USB host, and to box 2008, where we send USB power (5 volts) to the 2.5 mm jack. From here, we proceed to box 2010, where we detect whether any current (associated with the USB power we are providing) is being drawn through the jack. If current is being drawn, we assume the connected device is an external interface such as interface 220, and proceed along the branch 2000*a*. At box 2056, we set a 1-second timer, and wait to see if the device enumerates (boxes 2058, 2060, point 2057). The typical time from power-on to the start of enumeration of a USB device is 0.07 seconds. Thus, if no enumeration is received from the device within the 1-second time window, something is wrong. Operation in this case proceeds to box 2062, where the unit withdraws the USB power from the 2.5 mm jack (box 2062), and provides an error indication (point 2064).

On the other hand, in reference to box 2058, if the device enumerates, operation proceeds to box 2066, where we may determine if the device is authentic on the basis of an ID code embedded in the enumeration information. More specifically, USB enumeration requires a number of items to be communicated by the enumeration. One such item is a uniquely assigned manufacturer ID. At box 2066, we isolate this manufacturer information and determine if the device is "genuine" or "authentic" by comparing this ID code to an ID code stored in the sound-producing device. Such a comparison allows us to ensure the external interface and the sound-producing device were both made by the same manufacturer. If the two ID codes match, we assume the product is genuine, and operation proceeds to box 2068 where the controller provides the sound-producing device with full functionality. On the other hand, if the ID codes do not match, we assume the device is not genuine, and operation proceeds to box 2070, where the controller provides the sound-producing device with limited (reduced) functionality. In some cases, the controller may be programmed such that limited functionality is characterized by the sound-producing device not providing any audio output signal to the audio transducer(s).

Still in reference to FIG. 20, returning to box 2010, we address the case where the controller detects no current being drawn through the jack. In this case, the device may be a simple wired analog audio signal, or possibly nothing at all is connected. To proceed, we initially assume the device is a wired analog audio connection. We withdraw USB power from the 2.5 mm jack (box 2012), configure the port as an analog audio input (box 2014), show an "analog" status on the LEDs of the user interface (box 2016), and boot and configure the DSP (box 2018). Then, we wait for an extended period such as 30 seconds and check to see if the DSP detects any audio signal present (boxes 2020, 2022, 2024, and point 2021) during that period. If an audio signal is detected, operation proceeds to box 2034, where we power up the amplifier, and box 2036, where we ramp the volume to the default level, and then enter a sleep state at point 2038. If no audio signal is detected, operation instead goes to boxes 2026 through 2032, where the DSP is powered down, the port is de-configured, the LEDs are turned off, and a sleep state is entered.

The result of an interface search such as that of FIG. 20 may be stored in non-volatile (e.g. EEPROM) memory of the sound-producing device so that, if the unit is powered up after being powered down, the unit may first configure itself as the same type of interface as at the time of the preceding power-down, so that normal operation of the unit may be achieved as quickly as possible without taking the time to perform a full interface search. The unit however preferably checks to confirm that this same interface type is still in use; if it is not, then it may proceed with a full interface search such as that of FIG. 20.

FIG. 21 shows a flow chart 2100 representing one of the many ways in which a sound-producing device such as that of FIG. 2B may be operated. At a starting point 2102, the power to the device is turned on, e.g. by plugging the device into a wall socket, or activating a switch on the user interface to connect power from a wall outlet or from an internal battery to the circuit components of the device. At box 2104, the device then configures itself in a default analog mode to receive analog audio signals. In this configuration, the MUX1 is set to bypass (in FIG. 2B, the switch 253 connects the line 250*c* to the line 250*a* and not to line 250*b*), the MUX2 is set to "jack" (in FIG. 2B, the switch 254 connects the line 250, not the line 256, to the line 250*c*), and the power source provides electrical power at a 5V level or other suitable voltage level to the electronic coupling member 231. (The reader will understand that in the sound-producing devices of FIGS. 2, 2A, and 2B, a switch or other control device may be provided either as part of the power source, or separate from the power source, to allow electrical power supplied to the electronic coupling member 231 to be turned on or off, preferably by a control signal provided by the digital controller, without disrupting power provided by the power source to the other circuit components in the sound-producing device.) Successful implementation of the analog mode may be indicated (box 2106) on the user interface, e.g. by illuminating one or more of the LEDs 1133*c* (FIG. 11). The DSP is booted and configured (box 2108), such that the DSP is configured to accept analog audio input (box 2110). Note for example in FIG. 2B that when MUX2 is connected to the jack (electronic coupling member 231) and MUX1 is configured for bypass, audio signals received by the electronic coupling member 231 are directed to the analog input of the DSP 240*a*. The amplifier 244 is powered up (box 2112), and the volume is ramped to a default level (box 2114). The sound-producing device then continues to run in this mode, wherein a suitably conditioned analog audio signal is received by the electronic coupling member 231, processed by the DSP 240*a*, and forwarded on to the speaker(s) 246 to produce sound, while also monitoring for any interrupts provided to the digital controller 232 through the user interface 233 or otherwise (point 2116). Note that in this mode of operation, the sound-producing device may be coupled to an external interface, which may be powered by the 5V power supplied to the jack by the power source 236 to convert an initial audio signal to the appropriate (analog) conditioned audio signal.

In the event the digital controller 232 receives a first interrupt, operation shifts to box 2118, where the sound-producing device configures itself for a mode referred to here as BT mode. In this mode, the transceiver 255, which may be a Bluetooth device, is assumed to be activated. We also assume the transceiver 255 receives wireless digital audio-encoded signals 257, and converts them to an analog audio output on line 256, but this is not intended to be limiting, and other scenarios are also possible. In the BT mode, the MUX1 is again set to bypass, the MUX2 is set to BT (i.e., in FIG. 2B, the switch 254 connects the line 256, not the line 250, to the line 250c), and the power source does not supply any electrical power to the electronic coupling member 231. In reference to FIG. 2B, when MUX2 is connected to the internal BT device or the like (transceiver 255) and MUX1 is configured for bypass, analog audio signals generated by the transceiver 255 are directed to the analog input of the DSP 240a. Thus, the DSP uses analog inputs (box 2120), and the BT mode is appropriately indicated (box 2122) on the user interface, e.g. by illuminating one or more of the LEDs. Operation of the sound-producing device continues in this manner while monitoring for any interrupts provided to the digital controller 232 through the user interface 233 or otherwise (point 2124).

In the event the digital controller 232 receives a second interrupt, operation shifts to box 2126, where the sound-producing device configures itself as a USB device—in contrast to a USB host. In this mode, the sound-producing device behaves like a peripheral USB device that is connected to a USB host, the USB host being for example the audio source. We also assume such an audio source transmits a digital audio-encoded signal to the sound-producing device. Thus, in this USB device mode, the MUX1 is set to non-bypass, the MUX2 is set to jack, and the power source again does not supply any electrical power to the electronic coupling member 231. In reference to FIG. 2B, when MUX2 is connected to the jack (electronic coupling member 231) and MUX1 is configured for non-bypass, digital audio signals provided to the electronic coupling member by the audio source are directed to a digital input of the digital controller 232 via line 250b, and processed and forwarded to a digital input of the DSP 240a via line 251. Thus, the DSP uses digital inputs (box 2128), and the USB device mode is appropriately indicated (box 2130) on the user interface, e.g. by illuminating one or more of the LEDs. Operation of the sound-producing device continues in this manner while monitoring for any interrupts provided to the digital controller 232 through the user interface 233 or otherwise (point 2132).

The reader will understand that the flow charts of FIGS. 15-21 are specific implementations and can be practiced or implemented in numerous alternative ways. Furthermore, the disclosed sound-producing devices, external interfaces, and related devices and systems can be modified in numerous ways. For example, the electronic programming instructions stored in memory that control the operation of the sound-producing device can be reprogrammed remotely, e.g. by establishing a digital communication link with a computer or computer application through the 2.5 mm jack, such communication link being capable of changing the programming instructions in memory. Also, in some embodiments, audio-encoded signals can be communicated not only from the audio source (e.g. source 210) to the external interface (e.g. interface 220), but also in the other direction, i.e., from the external interface to the audio source. This may be accomplished for example by incorporating a microphone into the external interface, and configuring the controller 222 to communicate an audio-encoded signal from such microphone to the audio source 210 along the same communication path that is used to communicate the signal 212 to the external interface.

Unless otherwise indicated, all numbers expressing feature sizes, amounts, ranges, limits, and physical and other properties used in the specification and claims are to be understood as being modified in all instances by the term "about". Accordingly, unless indicated to the contrary, the numerical parameters set forth in the specification and claims are approximations that can vary depending on the desired properties sought to be obtained by those skilled in the art utilizing the teachings disclosed herein.

As used in this specification and the appended claims, the singular forms "a," "an," and "the" encompass embodiments having plural referents, unless the context clearly dictates otherwise. As used in this specification and the appended claims, the term "or" is generally employed in its sense including "and/or" unless the context clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

When a given element (including one or more elements, components, layers, or the like) is described as being "on," "connected to," "coupled to," or "attached to" another element (including one or more elements, components, layers, or the like), the given element can be directly on, directly connected to, directly coupled to, or directly attached to such other element, or an intervening element (including one or more elements, components, layers, or the like) may be interposed between the given element and the other element. When the given element is referred to as being "directly on," "directly connected to," "directly coupled to," "directly attached to," or "in contact with" the other element, there are no, or substantially no, intervening elements.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

This document discloses numerous embodiments, including but not limited to the following:

Item 1 is a system, comprising:
  a sound-producing device that includes a power source, an audio transducer, a digital controller, and a first electronic coupling member, the digital controller coupled to the power source and having an input coupled to the first electronic coupling member and an output coupled to the audio transducer; and
  an external interface comprising signal conversion circuitry and a second electronic coupling member, the signal conversion circuitry adapted to convert a first audio-encoded signal to a conditioned audio-encoded signal, the conditioned audio-encoded signal being compatible with the sound-producing device but the first audio-encoded signal not being compatible with the sound-producing device, and wherein the second electronic coupling member is configured to removably mate with the first electronic coupling member;

wherein the power source in the sound-producing device powers the signal conversion circuitry in the external interface through the first and second electronic coupling members; and wherein the external interface provides the conditioned audio-encoded signal to the sound-producing device through the first and second electronic coupling members.

Item 2 is the system of item 1, wherein the first and second electronic coupling members comprise a jack and plug combination, and wherein the jack and plug each comprise four conductors, two of which are used to supply electrical power from the sound-producing device to the external interface, and two of which are used for audio data transmission between the sound-producing device and the external interface.

Item 3 is the system of item 2, wherein the jack comprises a 2.5 mm audio jack.

Item 4 is the system of any of the foregoing items, wherein the sound-producing device has an exterior, and wherein the first electronic coupling member is disposed at the exterior.

Item 5 is the system of any of the foregoing items, wherein the sound-producing device comprises headphones or a loudspeaker unit.

Item 6 is the system of any of the foregoing items, wherein the sound-producing device further comprises a digital signal processor (DSP) having a digital audio input that is connected to the output of the digital controller, and wherein the output of the digital controller couples to the audio transducer through the DSP.

Item 7 is the system of any of the foregoing items, wherein the power source comprises a transformer adapted to receive line power, or wherein the power source comprises a rechargeable battery or other battery.

Item 8 is the system of any of the foregoing items, wherein the external interface is configured to receive the first audio-encoded signal through a wired connection.

Item 9 is the system of any of items 1-7, wherein the external interface is configured to receive the first audio-encoded signal through a wireless connection.

Item 10 is the system of item 9, wherein the first audio-encoded signal has a Bluetooth format, a Wi-Fi format, or a WiMAX format.

Item 11 is the system of any of the foregoing items, wherein the conditioned audio-encoded signal comprises a digitally encoded audio signal.

Item 12 is the system of any of the foregoing items, further comprising:
 a second external interface comprising second signal conversion circuitry and a third electronic coupling member, the second conversion circuitry adapted to convert a second audio-encoded signal to the conditioned audio-encoded signal, the second audio-encoded signal not being compatible with the sound-producing device, and wherein the third electronic coupling member is also configured to removably mate with the first electronic coupling member;
 wherein the first-mentioned external interface can be mated with the sound-producing device to produce a first combination that is responsive to the first audio-encoded signal but not the second audio-encoded signal; and
 wherein the second external interface can be mated with the sound-producing device to produce a second combination that is responsive to the second audio-encoded signal but not the first audio-encoded signal.

Item 13 is an external interface designed for removable connection to a sound-producing device, the external interface comprising:
 a 2.5 mm audio connector; and
 signal conversion circuitry adapted to convert a first audio-encoded signal to a conditioned audio-encoded signal;
 wherein the external interface is configured to receive electrical power, and transmit the conditioned audio-encoded signal, through the 2.5 mm audio connector; and
 wherein the signal conversion circuitry is powered by the received electrical power.

Item 14 is the external interface of item 13, wherein the 2.5 mm audio connector has four conductors, two of which are used to supply electrical power to the external interface, and a remaining two of which are used for data transmission to transmit the conditioned audio-encoded signal.

Item 15 is the external interface of item 13 or 14, wherein the first and conditioned audio-encoded signals have different encoding formats.

Item 16 is the external interface of any of items 13-15, wherein the conditioned audio-encoded signal has a digital encoding format and the first audio-encoded signal has an analog encoding format, or wherein the conditioned audio-encoded signal has an analog encoding format and the first audio-encoded signal has a digital encoding format.

Item 17 is the external interface of any of items 13-16, wherein the first audio-encoded signal has a Bluetooth format, a Wi-Fi format, a WiMAX format, or a USB format.

Item 18 is a system, comprising:
 the external interface of any of items 13-17; and
 the sound-producing device, wherein the sound-producing device is compatible with the conditioned audio-encoded signal but not the first audio-encoded signal.

Item 19 is a sound-producing device, comprising:
 a housing;
 an audio transducer disposed within the housing;
 a digital controller and a signal processor disposed within the housing, the signal processor coupled to the digital controller and having an analog audio input, a digital audio input, and an audio output, the audio output coupled to the audio transducer;
 an audio jack suitable for removable connection to an audio plug, the audio jack disposed proximate an exterior of the housing and comprising two conductive contacts to receive an audio signal; and
 a switch disposed within the housing, the switch comprising a switch input, a first switch output, and a second switch output, the switch input coupled to the audio jack to receive the audio signal from the two conductive contacts, the first switch output coupled to the digital input of the signal processor through the digital controller, and the second switch output coupled to the analog input of the signal processor but bypassing the digital controller;
 wherein, in a first switch state, the switch connects the switch input to the first switch output but not to the second switch output, and in a second switch state, the switch connects the switch input to the second switch output but not to the first switch output.

Item 20 is the sound-producing device of item 19, wherein the switch shifts from the first switch state to the second switch state in response to a control signal from the digital controller.

Item 21 is the sound-producing device of item 19, wherein the switch input couples to the two conductive contacts of the audio jack by a second switch, the sound-producing device further comprising:
 a receiving device disposed in the housing, the receiving device configured to receive audio information wirelessly from a radio frequency source exterior to the housing, the receiving device having a second audio output, the second audio output also coupling to the switch input through the second switch.

Item 22 is the sound-producing device of item 19, further comprising:
 a power source configured to provide electrical power to the audio jack.

Item 23 is a system, comprising:
 the sound-producing device of item 22; and
 an external interface comprising signal conversion circuitry and an audio plug, the signal conversion circuitry adapted to convert a first audio-encoded signal to a conditioned audio-encoded signal, the conditioned audio-encoded signal being compatible with the sound-producing device but the first audio-encoded signal not being compatible with the sound-producing device, the audio plug adapted to mate with the audio jack;
 wherein the power source in the sound-producing device powers the signal conversion circuitry in the external interface through the audio plug and audio jack; and
 wherein the external interface provides the conditioned audio-encoded signal to the two conductive contacts of the audio jack through the audio plug.

Item 40 is a sound-producing device, comprising:
 an audio transducer;
 a power source;
 a first electronic coupling member configured to removably mate with a second electronic coupling member;
 a digital controller coupled to the power source and having an input coupled to the first electronic coupling member and an output coupled to the audio transducer; and
 a memory coupled to the digital controller, the memory containing an ID code;
 wherein the sound-producing device is configured to provide electrical power from the power source through the first electronic coupling member; and
 wherein the digital controller is configured to (a) receive an ID signal and optionally a conditioned audio-encoded signal through the first electronic coupling member, the conditioned audio-encoded signal being compatible with the sound-producing device and optionally with the digital controller, and (b) compare the ID signal to the ID code in the memory, and (c) provide a full functionality if the comparison produces a match, and provide a reduced functionality if the comparison does not produce a match.

Item 41 is the device of item 40, wherein the full functionality comprises providing an audio output signal, corresponding to the conditioned audio-encoded signal, to the audio transducer, and the reduced functionality comprises not providing the audio output signal to the audio transducer.

Item 42 is the device of item 40 or 41, wherein the device is a head-mounted unit such as a headphone se, or wherein the device is a loudspeaker unit.

Item 45 is the device of any of items 40-42, wherein the device has an exterior, and wherein the first electronic coupling member is disposed at the exterior.

Item 46 is the device of item 40, wherein the audio transducer comprises an electromagnetic speaker, an electrostatic speaker, or a piezoelectric speaker.

Item 47 is the device of item 40, further comprising:
 a digital-to-analog converter (DAC) connected to the output of the digital controller, the output of the digital controller coupling to the audio transducer through the DAC.

Item 47a is the device of item 40, further comprising:
 a digital signal processor (DSP) connected to the output of the digital controller, the output of the digital controller coupling to the audio transducer through the DSP.

Item 48 is the device of item 40, wherein the power source comprises a transformer adapted to receive line power, or wherein the power source comprises a rechargeable battery or other battery.

Item 51 is the device of item 40, wherein the digital controller is configured to select one of at least two different operating configurations as a function of what signal is provided at the first electronic coupling member.

Item 52 is the device of item 51, wherein the at least two different operating configurations include a first operating configuration in which the device operates as a USB device and a second operating configuration in which the device operates as a USB host.

Item 53 is the device of item 51, wherein the digital controller is configured to select one of three different operating configurations as a function of what signal is provided at the first electronic coupling member.

Item 54 is a system, comprising:
 the sound-producing device of item 40; and
 a first external interface comprising first signal conversion circuitry and the second electronic coupling member, the first signal conversion circuitry adapted to convert a first audio-encoded signal to the conditioned audio-encoded signal, the first audio-encoded signal not being compatible with the sound-producing device.

Item 55 is the system of item 54, wherein the power source in the sound-producing device powers the first signal conversion circuitry in the first external interface through the first and second electronic coupling members.

Item 56 is the system of item 54, wherein the first external interface provides the conditioned audio-encoded signal to the sound-producing device through the first and second electronic coupling members.

Item 57 is the system of item 54, wherein the first external interface is configured to receive the first audio-encoded signal through a wired connection.

Item 58 is the system of item 54, wherein the first external interface is configured to receive the first audio-encoded signal through a wireless connection.

Item 59 is the system of item 54, wherein the conditioned audio-encoded signal comprises a digitally encoded audio signal.

Item 60 is the system of item 54, further comprising:
 a source device configured to generate the first audio-encoded signal.

Item 61 is the system of item 54, further comprising:
 a second external interface comprising second signal conversion circuitry and a third electronic coupling member, the second conversion circuitry adapted to convert a second audio-encoded signal to the conditioned audio-encoded signal, the second audio-encoded signal not being compatible with the sound-producing device, and wherein the third electronic coupling member is also configured to removably mate with the first electronic coupling member;

wherein the first external interface can be mated with the sound-producing device to produce a first combination that is responsive to the first audio-encoded signal but not the second audio-encoded signal; and wherein the second external interface can be mated with the sound-producing device to produce a second combination that is responsive to the second audio-encoded signal but not the first audio-encoded signal.

The invention claimed is:

1. A system, comprising:
a sound-producing device that includes a power source, an audio transducer, a digital controller, and a first electronic coupling member, the digital controller coupled to the power source and having an input coupled to the first electronic coupling member and an output coupled to the audio transducer; and
an external interface comprising signal conversion circuitry and a second electronic coupling member, the signal conversion circuitry configured to convert a first audio-encoded signal to a conditioned audio-encoded signal, the conditioned audio-encoded signal being compatible with the sound-producing device but the first audio-encoded signal not being compatible with the sound-producing device, and wherein the second electronic coupling member is configured to removably mate with the first electronic coupling member;
wherein the power source in the sound-producing device powers the signal conversion circuitry in the external interface through the first and second electronic coupling members; and
wherein the external interface provides the conditioned audio-encoded signal to the sound-producing device through the first and second electronic coupling members.

2. The system of claim 1, wherein the first and second electronic coupling members comprise a jack and plug combination, and wherein the jack and plug each comprise four conductors, two of which are used to supply electrical power from the sound-producing device to the external interface, and two of which are used for audio data transmission between the sound-producing device and the external interface.

3. The system of claim 2, wherein the jack comprises a 2.5 mm audio jack.

4. The system of claim 1, wherein the sound-producing device has an exterior, and wherein the first electronic coupling member is disposed proximate the exterior.

5. The system of claim 1, wherein the sound-producing device comprises headphones or a loudspeaker unit.

6. The system of claim 1, wherein the sound-producing device further comprises a digital signal processor (DSP) having a digital audio input that is connected to the output of the digital controller, and wherein the output of the digital controller couples to the audio transducer through the DSP.

7. The system of claim 1, wherein the power source comprises a rechargeable battery.

8. The system of claim 1, wherein the external interface is configured to receive the first audio-encoded signal through a wired connection.

9. The system of claim 1, wherein the external interface is configured to receive the first audio-encoded signal through a wireless connection.

10. The system of claim 9, wherein the first audio-encoded signal has a Bluetooth format, a Wi-Fi format, a WiMAX format, or a USB format.

11. The system of claim 1, wherein the conditioned audio-encoded signal comprises a digitally encoded audio signal.

12. The system of claim 1, further comprising:
a second external interface comprising second signal conversion circuitry and a third electronic coupling member, the second conversion circuitry configured to convert a second audio-encoded signal to the conditioned audio-encoded signal, the second audio-encoded signal not being compatible with the sound-producing device, and wherein the third electronic coupling member is also configured to removably mate with the first electronic coupling member;
wherein the external interface is configured to be mated with the sound-producing device to produce a first combination that is responsive to the first audio-encoded signal but not the second audio-encoded signal; and
wherein the second external interface is configured to be mated with the sound-producing device to produce a second combination that is responsive to the second audio-encoded signal but not the first audio-encoded signal.

* * * * *